(12) United States Patent
Okamoto

(10) Patent No.: US 7,180,633 B2
(45) Date of Patent: Feb. 20, 2007

(54) COLOR CONVERSION DEFINITION CREATING METHOD, COLOR CONVERSION DEFINITION CREATING APPARATUS, AND COLOR CONVERSION DEFINITION CREATING PROGRAM STORAGE MEDIUM

(75) Inventor: Takahiro Okamoto, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 966 days.

(21) Appl. No.: 10/280,051

(22) Filed: Oct. 25, 2002

(65) Prior Publication Data

US 2003/0090691 A1    May 15, 2003

(30) Foreign Application Priority Data

Nov. 12, 2001 (JP) .............................. 2001-345565

(51) Int. Cl.
   *G06F 15/00* (2006.01)
(52) U.S. Cl. .................... 358/1.9; 358/518; 345/604; 382/167; 347/43
(58) Field of Classification Search ................ 358/1.9; 345/604; 382/167; 347/43
   See application file for complete search history.

(56) References Cited

U.S. PATENT DOCUMENTS

| | | | | |
|---|---|---|---|---|
| 5,425,134 A | * | 6/1995 | Ishida | 358/1.9 |
| 5,774,238 A | * | 6/1998 | Tsukada | 358/529 |
| 6,377,366 B1 | * | 4/2002 | Usami | 358/520 |
| 6,580,822 B1 | * | 6/2003 | Takei | 382/162 |
| 6,778,300 B1 | * | 8/2004 | Kohler | 358/529 |
| 6,867,883 B1 | * | 3/2005 | Cholewo et al. | 358/1.9 |
| 7,019,868 B2 | * | 3/2006 | Chang et al. | 358/2.1 |
| 7,050,627 B2 | * | 5/2006 | Cuciurean-Zapan et al. | 382/167 |
| 2002/0021325 A1 | * | 2/2002 | Koitabashi et al. | 347/43 |
| 2003/0189716 A1 | * | 10/2003 | Tsuji et al. | 358/1.9 |

FOREIGN PATENT DOCUMENTS

| | | |
|---|---|---|
| JP | 9-83824 | 3/1997 |
| JP | 2001-157073 | 6/2001 |

* cited by examiner

*Primary Examiner*—Twyler Lamb
*Assistant Examiner*—Mark R. Milia
(74) *Attorney, Agent, or Firm*—Sughrue Mion, PLLC

(57) ABSTRACT

In color conversion definition creating method and color conversion definition creating apparatus for creating a color conversion definition defining a relation of data conversion between RGB data for a printer and CMYK data for printing to perform printing in which a color of an image outputted by a printer receiving the RGB data and outputting the image is reproduced, a data conversion algorithm 60, in which color conversion parameters customized by a skilled person in color customizing are set up, is used to determine a curve of K on a gray axis (a first K-function creating section 54), and the data conversion algorithm 60 is altered into a color conversion algorithm faithful in colorimetry as to K to determine values of K of the whole color spaces (a second K-function creating section 54). With respect to C, M and Y besides K, values are determined so that calorimetric values are matched.

6 Claims, 18 Drawing Sheets

COLOR CONVERSION DEFINITION CREATING METHOD, COLOR CONVERSION DEFINITION CREATING APPARATUS, AND COLOR CONVERSION DEFINITION CREATING PROGRAM STORAGE MEDIUM

BACKGROUND OF THE INVENTION

1. Field of the Invention

The present invention relates to color conversion definition creating method and color conversion definition creating apparatus for creating a color conversion definition defining a relation of data conversion between RGB data representative of a combination of values of R (red), G (green) and B (blue) for a printer and CMYK data representative of a combination of values of C (cyan), M (magenta), Y (yellow) and K (black) for printing to perform printing in which a color of an image outputted by a printer receiving the RGB data and outputting the image is reproduced, and a color conversion definition creating program storage medium storing a color conversion definition creating program which causes a computer to operate as the color conversion definition creating apparatus when the color conversion definition creating program is incorporated into the computer.

2. Description of the Related Art

Hitherto, as an apparatus for applying a high quality of color processing for printing to image data representative of an image, there is known an apparatus (for example, Japanese Patent Application Gazette Hei.9-83824) in which upon receipt of CMY data representative of a combination of density values of C, M and Y, CMYK data representative of a combination of dot % of C, M, Y, and K is outputted.

This apparatus receives the CMY data and performs a color processing. Even recently, while there are proposed various improvements on such an apparatus, such an apparatus is concerned with a well-established technology in base, and there exist many skilled persons capable of operating such an apparatus to perform a high quality of color processing (this color processing is referred to "set up").

Recently, as color management technologies have come into wide use, there is increased a necessity for obtaining a high quality of CMYK data for printing in accordance with color data other than the CMY data. As one of the examples, it may be required that upon receipt of RGB data representative of a combination of values of R, G, and B, an image, in which a color of a printed image obtained through an output of a printer based on the RGB data is faithfully reproduced, is printed.

In this case, it is considered that the RGB data is converted into the CMYK data using the apparatus proposed in the Japanese Patent Application Gazette Hei.9-83824 through conversion of the RGB data into the CMY data in accordance with any technique. As a technique of converting the RGB data into the CMY data, there is known a technique in which RGB is converted into a block CMY.

However, even if the RGB data is converted into the CMY data, and then converted into the CMYK data using the apparatus proposed in the above-mentioned Japanese Patent Publication Gazette, it is implied that the RGB data is converted into the CMYK data capable of obtaining a printed image which is reproduced into a color preferable for a skilled person by operation of the skilled person, and it involves "one's taste" for color. Thus, it is difficult to obtain the CMYK data capable of obtaining a printed image, in which a color of an image obtained through an output of a specified printer based on the RGB data is faithfully reproduced.

As another technique of converting the RGB data into the CMYK data, there is known a technique in which the RGB data is converted into calorimetric data such as L*a*b* data and XYZ data in accordance with a printer profile representative of color reproduction characteristics of the specified printer, while the CMYK data, which is associated with the same calorimetric data as that when the RGB data is converted into calorimetric data in accordance with the printer profile, is determined in accordance with a printing profile representative of color reproduction characteristics of a printing system with which a printed image intended to faithfully reproduce a color is obtained, so that the RGB data associated with the same calorimetric data is associated with the CMYK data. Thus, it is possible to convert the RGB data into the CMYK data representative of the same color on a calorimetric basis.

However, the RGB data consists of three variables of R, G and B, while the CMYK data consists of four variables of C, M, Y and K,. The CMYK data is concerned with the redundancy. And thus there exists a plurality of combinations of C, M, Y and K for one RGB data, which is same on a calorimetric basis. While the plurality of combinations corresponds to the same RGB data on a calorimetric basis, all the combinations have not a printing aptitude and combinations having the printing aptitude are restricted. A large factor as to whether there is the printing aptitude is a value of K. And in order to obtain the CMYK data capable of obtaining the same color on a calorimetric basis, there is a need to determine the value of K in accordance with a printing company, a printing machine and the like.

That is, the technology, in which the RGB data is converted into the CMY data, and then converted into the CMYK data using for example, the apparatus proposed in the above-mentioned Japanese Patent Publication Gazette, is no problem, since the value of K is adjusted by a skilled person to a value suitable for the printing company and the printing machine. However, it is difficult to faithfully reproduce a color of an image outputted by a specified printer in accordance with the RGB. On the other hand, in case of a technology of matching the calorimetric values, it involves a problem that it is difficult to obtain CMYK data having the printing aptitude.

SUMMARY OF THE INVENTION

In view of the foregoing, it is an object of the present invention to provide color conversion definition creating method and color conversion definition creating apparatus for creating a color conversion definition defining a relation of data conversion between RGB data and CMYK data, which is excellent in the printing aptitude and is capable of obtaining a printed image wherein a color of an image outputted by a specified printer in accordance with the RGB is faithfully reproduced, and a color conversion definition creating program storage medium storing a color conversion definition creating program which causes a computer to operate as the color conversion definition creating apparatus when the color conversion definition creating program is incorporated into the computer.

To achieve the above-mentioned object, the present invention provides a color conversion definition creating method of creating a color conversion definition defining a relation of data conversion between RGB data representative of a combination of values of R, G and B for a printer and CMYK data representative of a combination of values of C, M, Y and K for printing to perform printing in which a color of an image outputted by a printer receiving the RGB data and outputting the image is reproduced, said color conversion definition creating method comprising:

a first conversion step of converting RGB data for a printer into calorimetric data of device non-dependence in accordance with a printer profile representative of color reproduction characteristic of the printer;

a second conversion step of converting the calorimetric data determined in said first conversion step into CMY data representative of a combination of values of C, M and Y;

a first K-function creating step of setting up a first color conversion parameter and determines a first function of K from CMY data of C=M=Y of CMY data determined in said second conversion step in accordance with a data conversion algorithm for converting the CMY data into CMYK data having a printing aptitude according to the first color conversion parameter set up;

a first association creating step of determining CMYK data bound by the first function of K determined in said first K-function creating step, associated with the same calorimetric data as the calorimetric data associated with CMY data of C=M=Y of the CMY data determined in said second conversion step, in accordance with a printing profile representative of color reproduction characteristic of printing, so that a first association for providing an association between the CMY data of C=M=Y and the CMYK data is determined;

a second K-function creating step of setting up a second color conversion parameter value based on the first association determined in said first association creating step instead of the first color conversion parameter, on the data conversion algorithm, and determining a second function of K over an arbitrary combination of C, M and Y from the CMY data determined in said second conversion step, in accordance with the data conversion algorithm on which the second color conversion parameter value is set up; and a second association creating step of determining CMYK data bound by the second function of K determined in said second K-function creating step, associated with the same calorimetric data as the calorimetric data associated with an arbitrary combination of C, M and Y of the CMY data determined in said second conversion step, in accordance with the printing profile, so that a second association for providing an association between the arbitrary combination of C, M and Y of the CMY data and the CMYK data is determined.

According to the color conversion definition creating method of the present invention as mentioned above, the above-mentioned data conversion algorithm, that is, for example, the apparatus proposed in the above-mentioned Japanese Patent Application Gazette, is used to determine a function of K, and the function of K is used as the binding condition to determine CMYK data so that calorimetric data associated with RGB data through the a printer profile is identical with calorimetric data associated with CMYK data through the a printing profile. This feature makes it possible to determine a color conversion definition, which is excellent in a printing aptitude and is capable of obtaining a printed image wherein a color of an image obtained through printing out by a printer is faithfully reproduced.

Here, to determine the function of K, it is not so easy. First, the first function of K is determined in accordance with CMY data of C=M=Y (on the gray axis), and determined is the association (the first association) between the CMY data of C=M=Y (on the gray axis) and the CMYK data bound by the first function of K, which are faithful in calorimeter to the CMY data. Next, color conversion parameters to be set up to the above-mentioned data conversion algorithm are altered from the color conversion parameters (the first color conversion parameter) including the element of "taste" to color conversion parameters (the second color conversion parameter) removing the element of "taste" as to at least K in accordance with the first association.

Thus, while the element of "taste" as to at least K is removed from the above-mentioned data conversion algorithm, the function (the second function of K) of K is determined from CMY data over an arbitrary combination of C, M and Y. This feature makes it possible to determine the function of K having the printing aptitude on the whole color space.

Thereafter, there are determined CMYK data bound by the function (the second function of K) of K, which are faithful in colorimetry. This feature makes it possible to determine the color conversion definition between RGB data and CMYK data, which are faithful in colorimetry and are excellent in the printing aptitude.

In the color conversion definition creating method according to the present invention as mentioned above, it is acceptable that said second conversion step comprises a three primary colors RGB data creating step of converting the calorimetric data into three primary colors RGB data representative of a combination of values of R, G and B, and a CMY data creating step of creating CMY data in such a manner that values of three primary colors R, G and B represented by the three primary colors RGB data obtained in said three primary colors RGB data creating step are subjected to a logarithmic transformation.

In this case, it is preferable that said color conversion definition creating method further comprises a parameter computing step of computing parameters for converting calorimetric data into three primary colors RGB data in accordance with a chromaticity value of a predetermined white point on x-y chromaticity diagram and chromaticity values of three points associated with RGB three primary colors on the x-y chromaticity diagram, and said three primary colors RGB data creating step converts the calorimetric data into three primary colors RGB data in accordance with the parameters computed in said parameter computing step.

Further, in this case, it is preferable that in said parameter computing step, defined as three points associated with RGB three primary colors are vertexes of a triangle including a reproducible color gamut, which are located at three straight lines on the x-y chromaticity diagram, coupling the predetermined white point on x-y chromaticity diagram with three points representative of main wavelengths of RGB three primary colors of the reproducible color gamut on the x-y chromaticity diagram associated with a gathering of full colors capable of being reproduced in a calorimetric system for obtaining the printer profile.

Further to achieve the above-mentioned object of the present invention, the present invention provides a color conversion definition creating apparatus for creating a color conversion definition defining a relation of data conversion between RGB data representative of a combination of values of R, G and B for a printer and CMYK data representative of a combination of values of C, M, Y and K for printing to perform printing in which a color of an image outputted by a printer receiving the RGB data and outputting the image is reproduced, said color conversion definition creating method comprising:

a first conversion section for converting RGB data for a printer into calorimetric data of device non-dependence in accordance with a printer profile representative of color reproduction characteristic of the printer;

a second conversion section for converting the colorimetric data determined in said first conversion section into CMY data representative of a combination of values of C, M and Y;

a first K-function creating section for setting up a first color conversion parameter and determines a first function of K from CMY data of C=M=Y of CMY data determined in said second conversion section in accordance with a data conversion algorithm for converting the CMY data into CMYK data having a printing aptitude according to the first color conversion parameter set up;

a first association creating section for determining CMYK data bound by the first function of K determined in said first K-function creating section, associated with the same calorimetric data as the calorimetric data associated with CMY data of C=M=Y of the CMY data determined in said second conversion section, in accordance with a printing profile representative of color reproduction characteristic of printing, so that a first association for providing an association between the CMY data of C=M=Y and the CMYK data is determined;

a second K-function creating section for setting up a second color conversion parameter value based on the first association determined in said first association creating section instead of the first color conversion parameter, on the data conversion algorithm, and determining a second function of K over an arbitrary combination of C, M and Y from the CMY data determined in said second conversion section, in accordance with the data conversion algorithm on which the second color conversion parameter value is set up; and a second association creating section for determining CMYK data bound by the second function of K determined in said second K-function creating section, associated with the same calorimetric data as the calorimetric data associated with an arbitrary combination of C, M and Y of the CMY data determined in said second conversion section, in accordance with the printing profile, so that a second association for providing an association between the arbitrary combination of C, M and Y of the CMY data and the CMYK data is determined.

Furthermore, to achieve the above-mentioned object of the present invention, the present invention provides a color conversion definition creating program storage medium storing a color conversion definition creating program which causes a computer to operate as a color conversion definition creating apparatus, when said color conversion definition creating program is incorporated into the computer and executed, said color conversion definition creating program comprising:

a first conversion section for converting RGB data for a printer into calorimetric data of device non-dependence in accordance with a printer profile representative of color reproduction characteristic of the printer;

a second conversion section for converting the colorimetric data determined in said first conversion section into CMY data representative of a combination of values of C, M and Y;

a first K-function creating section for setting up a first color conversion parameter and determines a first function of K from CMY data of C=M=Y of CMY data determined in said second conversion section in accordance with a data conversion algorithm for converting the CMY data into CMYK data having a printing aptitude according to the first color conversion parameter set up;

a first association creating section for determining CMYK data bound by the first function of K determined in said first K-function creating section, associated with the same calorimetric data as the calorimetric data associated with CMY data of C=M=Y of the CMY data determined in said second conversion section, in accordance with a printing profile representative of color reproduction characteristic of printing, so that a first association for providing an association between the CMY data of C=M=Y and the CMYK data is determined;

a second K-function creating section for setting up a second color conversion parameter value based on the first association determined in said first association creating section instead of the first color conversion parameter, on the data conversion algorithm, and determining a second function of K over an arbitrary combination of C, M and Y from the CMY data determined in said second conversion section, in accordance with the data conversion algorithm on which the second color conversion parameter value is set up; and a second association creating section for determining CMYK data bound by the second function of K determined in said second K-function creating section, associated with the same calorimetric data as the calorimetric data associated with an arbitrary combination of C, M and Y of the CMY data determined in said second conversion section, in accordance with the printing profile, so that a second association for providing an association between the arbitrary combination of C, M and Y of the CMY data and the CMYK data is determined.

Incidentally, with respect to the color conversion definition creating apparatus and the color conversion definition creating program storage medium storing a color conversion definition creating program according to the present invention, here, there are simply shown their basic forms. It is noted, however, that the color conversion definition creating apparatus and the color conversion definition creating program storage medium of the present invention includes various modifications of the color conversion definition creating apparatus and the color conversion definition creating program storage medium corresponding to the various modifications of the above-mentioned color conversion definition creating method, respectively.

DETAILED DESCRIPTION OF PREFERRED EMBODIMENTS

Embodiments of the present invention will be described with reference to the accompanying drawings.

Figure 1:
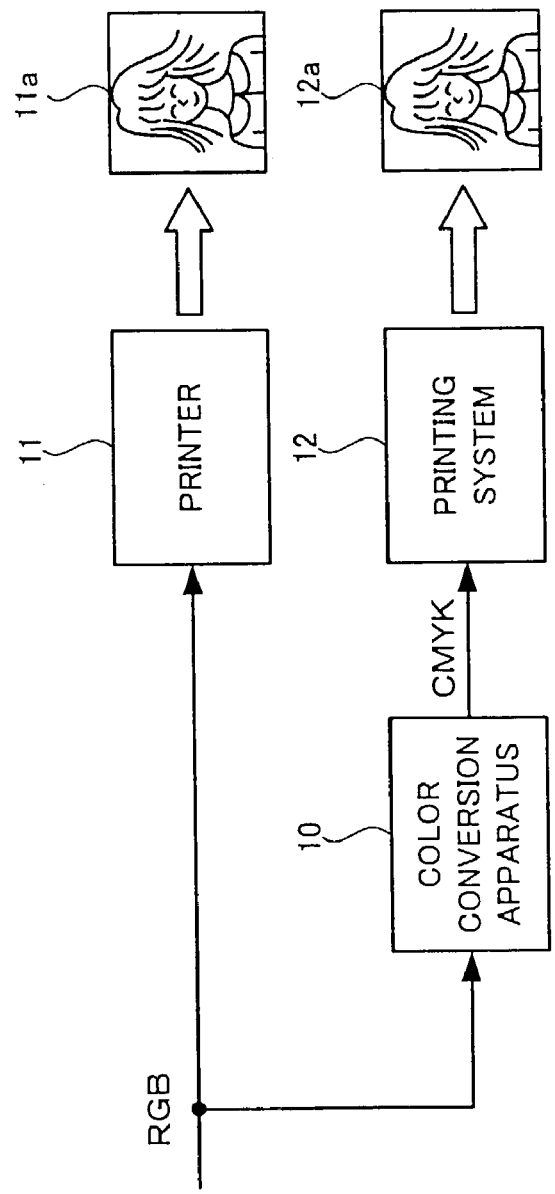
FIG. 1 is a view showing a system adopting a color conversion definition created in accordance with the present invention.

FIG. 1 is a view showing a system adopting a color conversion definition created in accordance with the present invention. Here, first, there will be described a position of the present invention referring to FIG. 1.

RGB data representative of an image is fed to a printer 11. The printer 11 outputs a printed image 11a in accordance with the fed RGB data. Here, it is desired to create a printing image 12a reproducing the same color as the printed image 11a. In this case, the RGB data is fed to a color conversion apparatus 10. The color conversion apparatus 10 stores a color conversion definition wherein the RGB data is associated with CMYK data, which is created beforehand. The color conversion apparatus 10 converts the RGB data into the CMYK data for printing in accordance with the color conversion definition. The CMYK data is fed to a printing system 12. The printing system 12 creates a film original plate in accordance with the CMYK data for instance, and creates a machine plate in accordance with the film original plate to perform a printing, so the printing image 12a is created.

As far as the color conversion apparatus 10 'properly' converts the RGB data into CMYK data, the printing image 12a will be an image having the same color as the printed image 11a.

In order that the color conversion apparatus 10 'properly' converts the RGB data into CMYK data, it is insufficient that the RGB data is simply converted into the CMYK data representative of the same color on a calorimetric basis, and there is a need that the CMYK data after the conversion is data (having printing aptitude) suitable for the printing system 12.

As mentioned above, when it is intended to create the color conversion definition for converting the RGB data into the CMYK data representative of the same color as the RGB data on a calorimetric basis in accordance with a printer profile representative of color reproduction characteristics of the printer 11, and a printing profile representative of color reproduction characteristics of the printing system 12, the RGB data consists of three variables of R, G and B, while the CMYK data consists of four variables of C, M, Y and K. Thus there exists a lot of CMYK data for one RGB data, which is same on a calorimetric basis, and thus it is impossible to unequivocally perform a conversion. Further, selection of optional one of a lot of CMYK data, which is same on a calorimetric basis, does not always select the CMYK data having the printing aptitude.

On the other hand, also as mentioned above, in the event that the RGB data is converted into data (CMY data) representative of CMY such as block CMY, and the CMY data is fed to a color conversion apparatus, which is adjusted so as to be suitable for the printing system 12 by operation of a skilled person, so that the CMY data is converted into the CMYK data, it is possible to obtain the CMYK data having a printing aptitude for the printing system 12. In this case, however, the CMY data is not always converted into the CMYK data representative of the same color as the original RGB data, and may be converted into CMYK data representative of color involving "one's taste" of the skilled person who performed color regulation and the printing company.

Hereinafter, there will be described a technique of creating a color conversion definition capable of converting RGB data for a printer suitable for the printer 11, which is set to the color conversion apparatus 10, into CMYK data having a printing aptitude for the printing system 12 and being capable of creating a printing image of the same color as the printed image 11a obtained when the printer 11 prints out in accordance with the RGB data.

Figure 2:
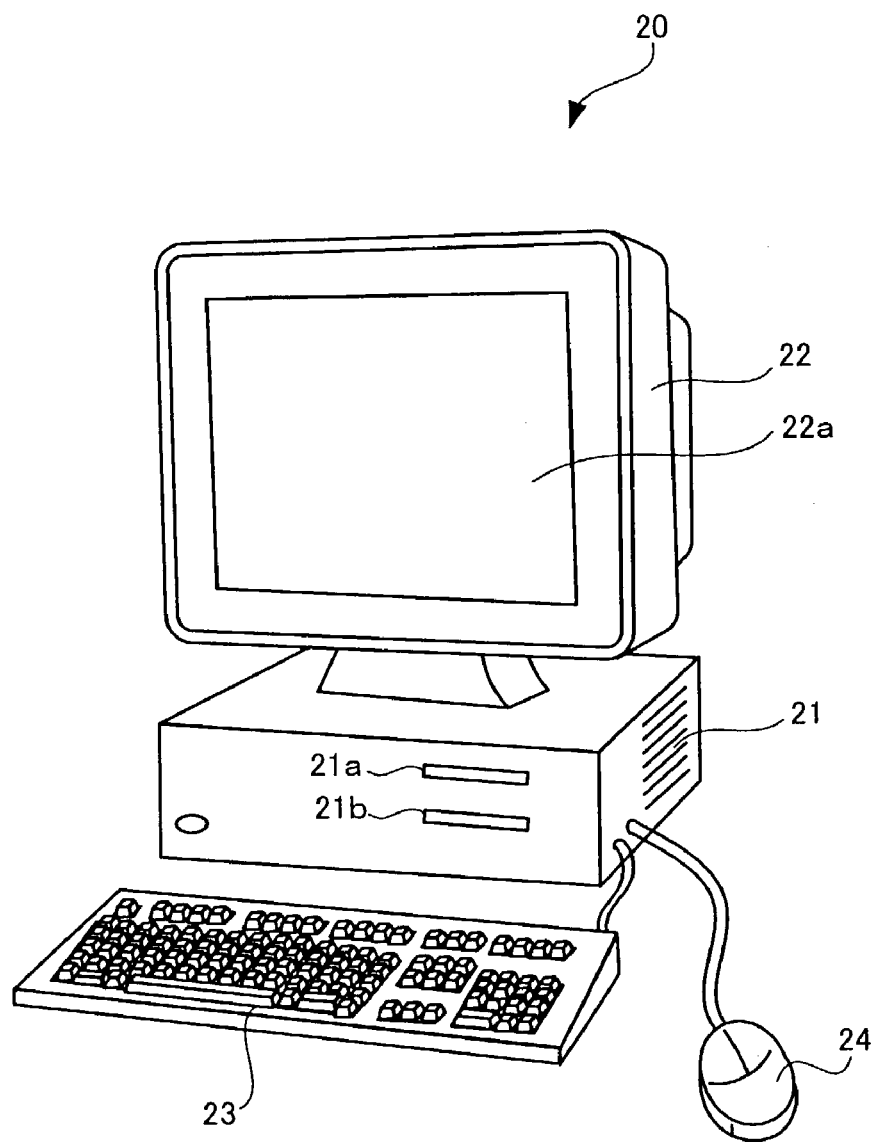
FIG. 2 is a perspective view of a personal computer constructing a color conversion definition creating apparatus according to an embodiment of the present invention.
Figure 3:
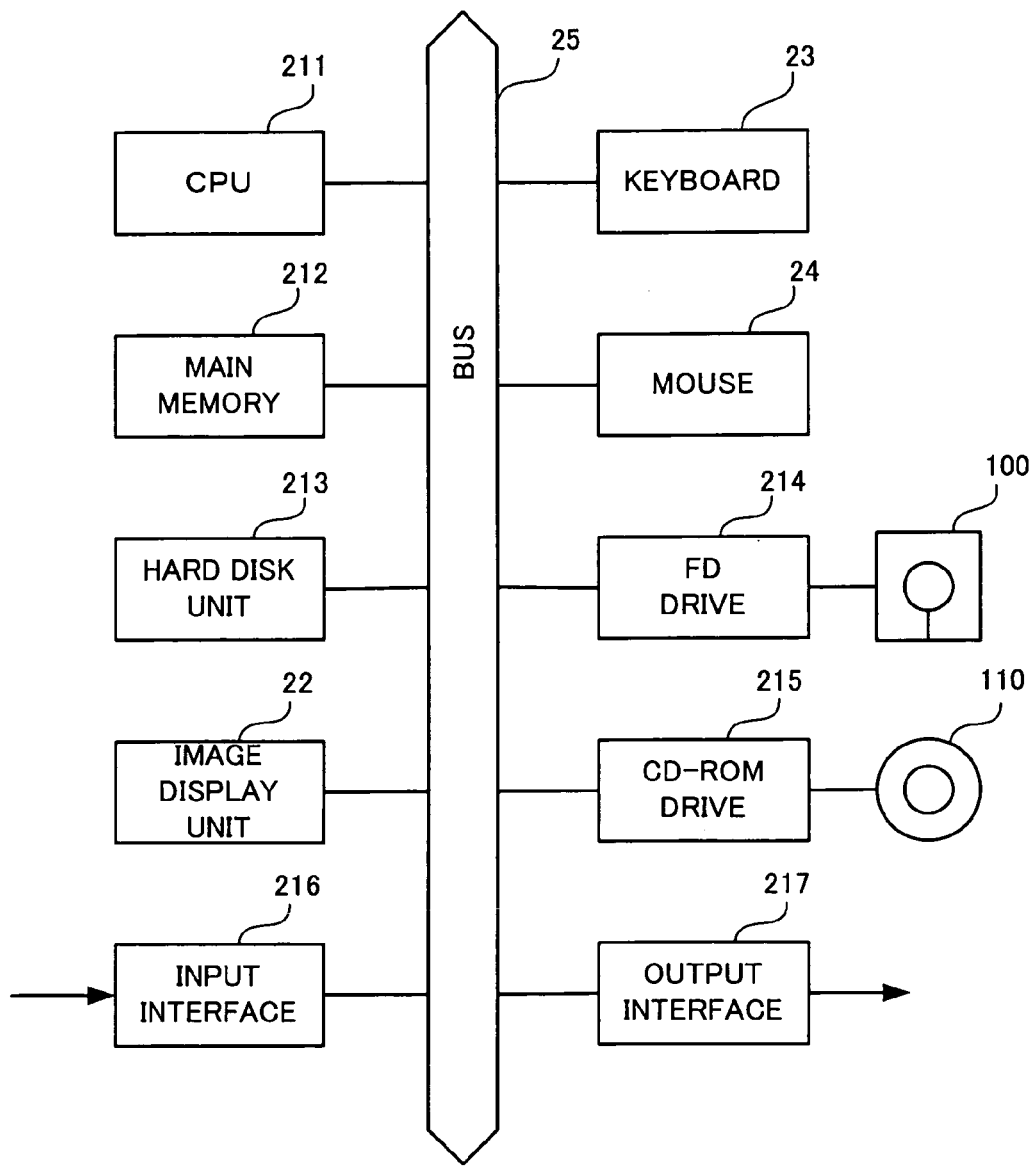
FIG. 3 is a hardware structural view of the personal computer.

FIG. 2 is a perspective view of a personal computer constructing a color conversion definition creating apparatus according to an embodiment of the present invention. FIG. 3 is a hardware structural view of the personal computer.

A hardware and OS (operation system) of a personal computer 20 and a color conversion definition creating program to be installed in the personal computer 20 and executed by the same constitute a color conversion definition creating apparatus according to an embodiment of the present invention.

The color conversion apparatus 10 shown in FIG. 1 can also be implemented by a personal computer. According to the present embodiment, the personal computer 20 shown in FIG. 2 and FIG. 3, which constitutes a color conversion definition creating apparatus according to the present embodiment, serves as the color conversion apparatus 10 shown in FIG. 1 on a hardware basis. However, it is acceptable that the personal computer constituting the color conversion definition creating apparatus is a personal computer different from the personal computer constituting the color conversion apparatus 10 shown in FIG. 1, and the color conversion definition created in the color conversion definition creating apparatus is installed in the color conversion apparatus 10 shown in FIG. 1.

Hereinafter, first, there will be explained a hardware of the personal computer shown in FIG. 2 and FIG. 3, and then there will be explained an embodiment of a color conversion definition creating method of the present invention.

As shown in FIG. 2, the personal computer 20 comprises, on an external appearance, a main frame unit 21, an image display unit 22 for displaying an image on a display screen 22*a* in accordance with an instruction from the main frame unit 21, a keyboard 23 for inputting various sorts of information to the main frame unit 21 in accordance with a key operation, and a mouse 24 for inputting an instruction according to, for example, an icon and the like, through designation of an optional position on the display screen 22*a*, the icon and the like being displayed on the position on the display screen 22*a*. The main frame unit 21 has a flexible disk (FD) mounting slot 21*a* for mounting a flexible disk (FD), and a CD-ROM mounting slot 21*b* for mounting a CD-ROM.

The main frame unit 21 comprises, as shown in FIG. 3, a CPU 211 for executing a various types of program, a main memory 212 in which a program stored in a hard disk unit 213 is read out and developed for execution by the CPU 211, the hard disk unit 213 for saving various types of programs and data, an FD drive 214 for accessing a flexible disk 100 mounted thereon, a CD-ROM drive 215 for accessing a CD-ROM 110 mounted thereon, an input interface 216 to receive RGB data from the exterior, and an output interface 217 to output CMYK data to the printing system 12. These various types of elements are connected via a bus 25 to the image display unit 22, the keyboard 23 and the mouse 24. It is noted that the personal computer 20 serves as the color conversion apparatus 10 shown in FIG. 1.

The CD-ROM 110 stores therein a color conversion definition creating program which causes the personal computer 20 to operate as the color conversion definition creating apparatus. The CD-ROM 110 is mounted on the CD-ROM drive 215 so that the color conversion definition creating program, which is stored in the CD-ROM 110, is up-loaded on the personal computer 20 and is stored in the hard disk unit 213.

Figure 4:
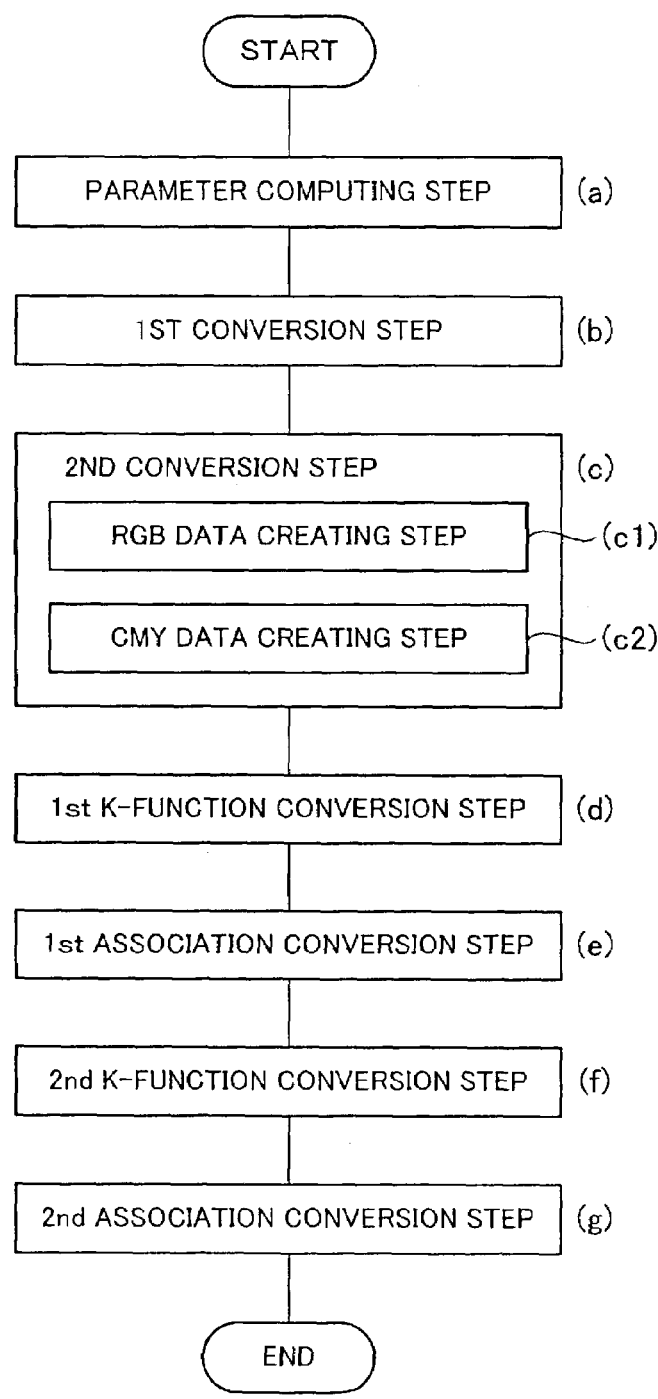
FIG. 4 is a flowchart useful for understanding a color conversion definition creating method according to an embodiment of the present invention.

FIG. 4 is a flowchart useful for understanding a color conversion definition creating method according to an embodiment of the present invention.

This color conversion definition creating method creates a color conversion definition defining a relation of data conversion between RGB data representative of a combination of values of R, G and B for a printer and CMYK data representative of a combination of values of C, M, Y and K for printing to perform printing in which a color of an image outputted by a printer receiving the RGB data and outputting the image is reproduced. The color conversion definition creating method comprises a parameter computing step (step a), a first conversion step (step b), a second conversion step (step c), a first K-function creating step (step d), a first association creating step (step e), a second K-function creating step (step f), and a second association creating step (step g). The second conversion step (step c) comprises an RGB data creating step (step c1) and a CMY data creating step (step c2).

The parameter computing step (step a) computes parameters for converting calorimetric data (XYZ) into three primary colors RGB data in accordance with a chromaticity value of a predetermined white point on x-y chromaticity diagram and chromaticity values of three points associated with RGB three primary colors on the x-y chromaticity diagram. Here, defined as three points associated with RGB three primary colors are vertexes of a triangle including the reproducible color gamut, which are located at three straight lines on the x-y chromaticity diagram, coupling the predetermined white point on x-y chromaticity diagram with three points representative of main wavelengths of RGB three primary colors of the reproducible color gamut on the x-y chromaticity diagram associated with a gathering of full colors capable of being reproduced in a calorimetric system for obtaining a printer profile of the printer 11.

The first conversion step (step b) converts RGB data for a printer into calorimetric data (XYZ) for device non-dependence in accordance with a printer profile representative of color reproduction characteristic of the printer 11.

The second conversion step (step c) converts the calorimetric data (XYZ) determined in the first conversion step (step b) into CMY data representative of a combination of C, M and Y. The second conversion step (step c) comprises an RGB data creating step (step c1) and a CMY data creating step (step c2). The three primary colors RGB data creating step (step c1) converts the calorimetric data XYZ into three primary colors RGB data representative of a combination of values of R, G and B in accordance with the parameters computed in the parameter computing step (step a). The CMY data creating step (step c2) creates CMY data in such a manner that values of three primary colors R, G and B represented by the three primary colors RGB data obtained in the RGB data creating step (step c1) are subjected to a logarithmic transformation.

The first K-function creating step (step d) sets up a first color conversion parameter and determines a first function of K from CMY data of C=M=Y of CMY data determined in the second conversion step (step c) in accordance with a data conversion algorithm for converting the CMY data into CMYK data having a printing aptitude according to the first color conversion parameter set up.

The first association creating step (step e) determines CMYK data bound by the first function of K determined in the first K-function creating step (step d), associated with the same calorimetric data as the calorimetric data associated with CMY data of C=M=Y of CMY data determined in the second conversion step (step c), in accordance with a printing profile representative of color reproduction characteristic of printing, so that a first association for providing an association between the CMY data of C=M=Y and the CMYK data is determined.

The second K-function creating step (step f) sets up a second color conversion parameter based on the first association determined in the first association creating step (step e) instead of the first color conversion parameter, on the data conversion algorithm, and determines a second function of K over an arbitrary combination of C, M and Y from the CMY data determined in the second conversion step (step c), in accordance with the data conversion algorithm on which the second color conversion parameter is set up.

The second association creating step (step g) determines CMYK data bound by the second function of K determined in the second K-function creating step (step f), associated with the same calorimetric data as the calorimetric data associated with an arbitrary combination of C, M and Y of the CMY data determined in the second conversion step (step c), in accordance with the printing profile of the printing system (cf. FIG. 1), so that a second association for providing an association between the arbitrary combination of C, M and Y of the CMY data and the CMYK data is determined.

That is, the first conversion step (step b) determines a relation between the RGB data and the calorimetric data (XYZ). The second conversion step (step c) determines a relation between the colorimetric data (XYZ) and the CMY data. And passing through the middle steps, the second association creating step (step g) determines a relation between the CMY data and the CMYK data. Thus, there is obtained a color conversion definition representative of a relation between the RGB data and the CMYK data.

The color conversion definition thus determined is set to the color conversion apparatus 10 shown in FIG. 1. According to the present embodiment, however, the color conversion apparatus 10 shown in FIG. 1 is implemented on the same personal computer as the color conversion definition creating apparatus of the present embodiment. Accordingly, the setting of the color conversion definition means that the color conversion definition thus created is placed in the available condition by a color conversion program operative in the personal computer.

The color conversion definition set to the color conversion apparatus 10 shown in FIG. 1 is used when the RGB data representative of the actual image is converted into the CMYK data, in the color conversion apparatus 10. The CMYK data, which is created in accordance with the color conversion definition, is coincident with the RGB data on a calorimetric basis, and also be suitable for printing in the printing system 12.

Details of the steps for the color conversion definition creating method in FIG. 4 will be described later.

Figure 5:
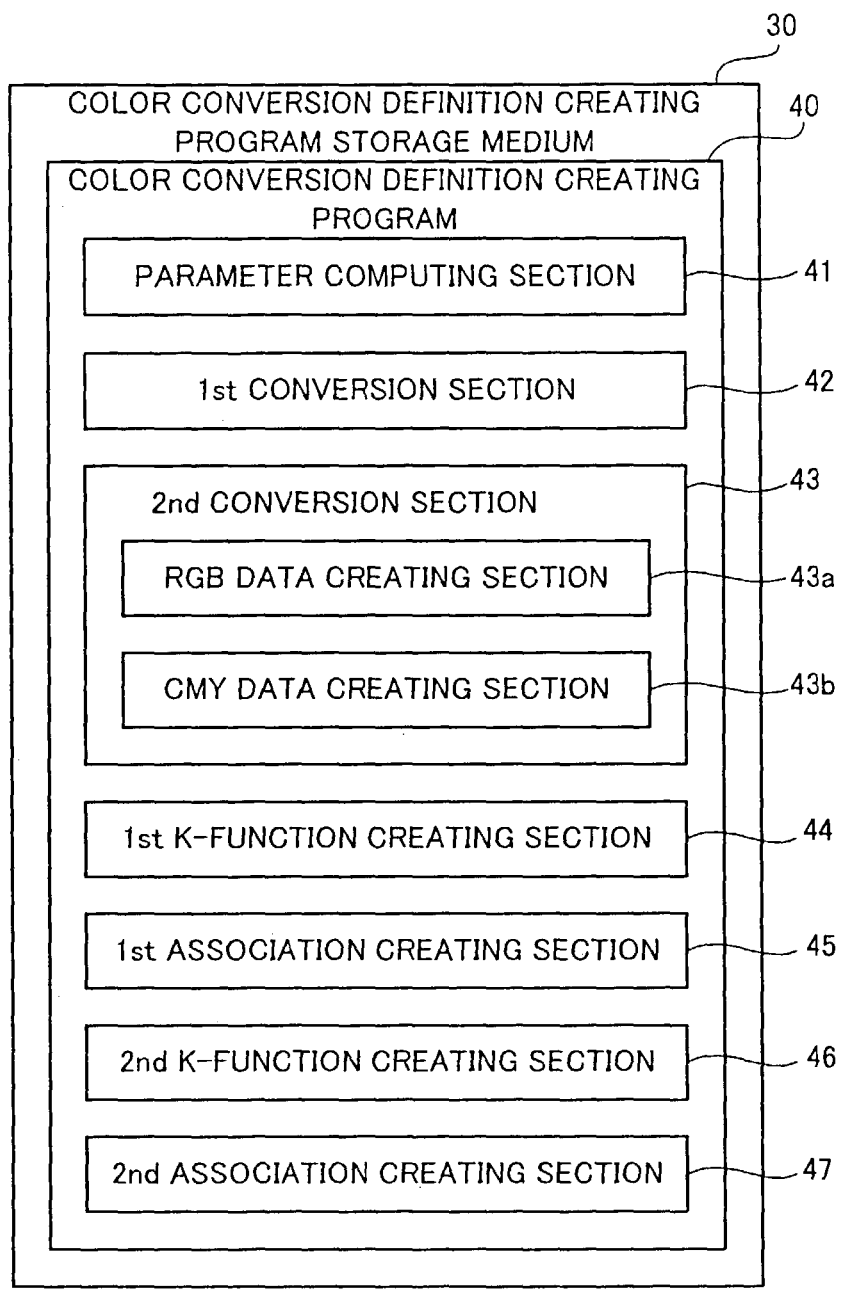
FIG. 5 is a view useful for understanding a color conversion definition creating program stored in a color conversion definition creating program storage medium according to an embodiment of the present invention.

FIG. 5 is a view useful for understanding a color conversion definition creating program stored in a color conversion definition creating program storage medium according to an embodiment of the present invention.

A color conversion definition creating program storage medium 30 shown in FIG. 5 representatively shows the CD-ROM 110 (cf. FIG. 3) in a state that a color conversion definition creating program 40 is stored, and the hard disk unit 213 in a state that the color conversion definition creating program 40 is stored after the CD-ROM 110 is mounted on the CD-ROM drive 215 and accessed, and the color conversion definition creating program 40 stored in the CD-ROM 110 is up loaded on the personal computer 20.

The color conversion definition creating program 40 is executed in the personal computer 20 shown in FIG. 2 and FIG. 3, and causes the personal computer 20 to operate as a color conversion definition creating apparatus for creating a color conversion definition defining a relation of data conversion between RGB data representative of a combination of values of R, G and B for a printer and CMYK data representative of a combination of values of C, M, Y and K for printing to perform printing in which a color of the printed image 11a outputted by the printer 11 (cf. FIG. 1) is reproduced. The color conversion definition creating program 40 comprises a parameter computing section 41, a first conversion section 42, a second conversion section 43, a first K-function creating section 44, a first association creating section 45, a second K-function creating section 46, and a second association creating section 47. The second conversion section 43 comprises an RGB data creating section 43a and a CMY data creating section 43b.

The parameter computing section 41, the first conversion section 42, the second conversion section 43 (the RGB data creating section 43a and the CMY data creating section 43b), the first K-function creating section 44, the first association creating section 45, the second K-function creating section 46, and the second association creating section 47, which constitute the color conversion definition creating program 40, are program components executing processing of the parameter computing step (step a), the first conversion step (step b), the second conversion step (step c) (the RGB data creating step (step c1) and a CMY data creating step (step c2)), the first K-function creating step (step d), the first association creating step (step e), the second K-function creating step (step f), and the second association creating step (step g), respectively, of the color conversion definition creating method shown in FIG. 4, when the color conversion definition creating program 40 is installed in the personal computer 20 shown in FIG. 2 and FIG. 3 and is executed.

Detailed explanation for the respective sections of the color conversion definition creating program will be described later.

Figure 6:
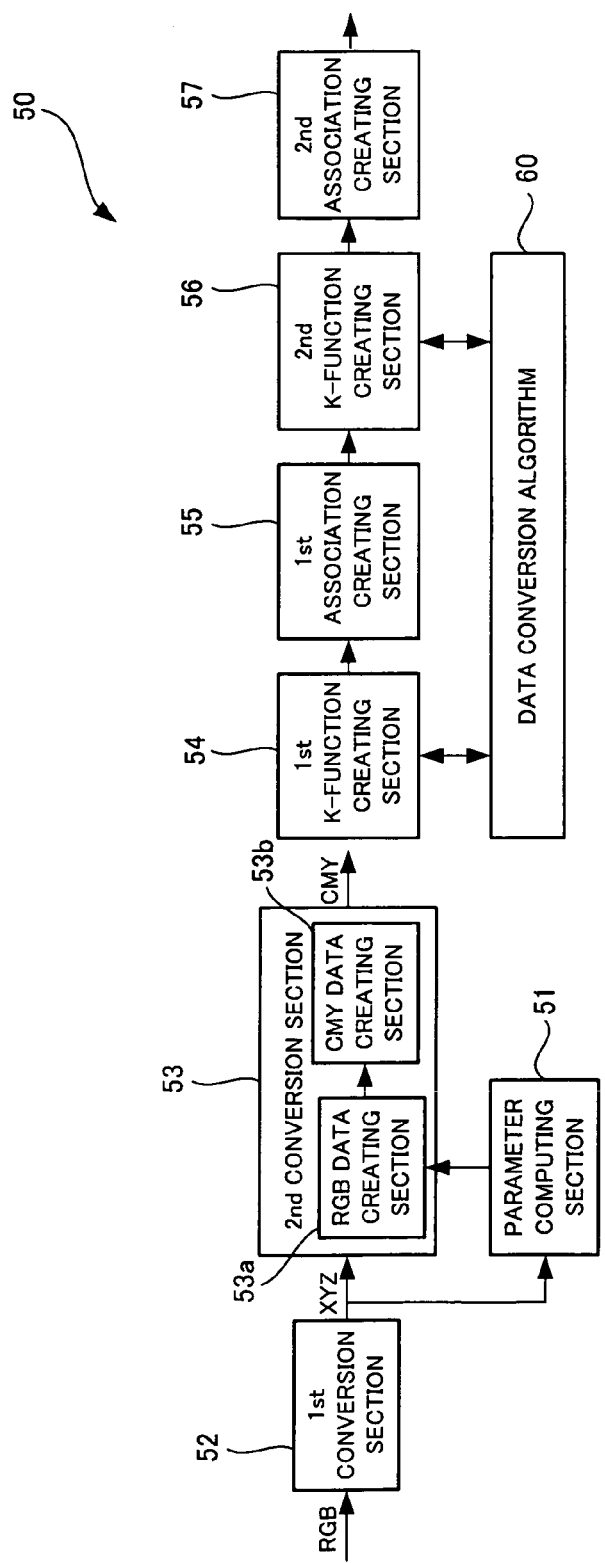
FIG. 6 is a functional block diagram of a color conversion definition creating apparatus according to an embodiment of the present invention.

FIG. 6 is a functional block diagram of a color conversion definition creating apparatus according to an embodiment of the present invention.

A color conversion definition creating apparatus 50 shown in FIG. 6 is constituted in such a manner that the color conversion definition creating program 40 shown in FIG. 5 is installed in the personal computer 20 shown in FIG. 2 and FIG. 3 and then executed.

The color conversion definition creating apparatus 50 is a color conversion definition creating apparatus for creating a color conversion definition defining a relation of data conversion between RGB data representative of a combination of values of R, G and B for a printer and CMYK data representative of a combination of values of C, M, Y and K for printing to perform printing in which a color of the printed image 11a outputted by the printer 11 (cf. FIG. 1) is reproduced. The color conversion definition creating apparatus 50 comprises a parameter computing section 51, a first conversion section 52, a second conversion section 53, a first K-function creating section 54, a first association creating section 55, a second K-function creating section 56, and a second association creating section 57. The second conversion section 53 comprises an RGB data creating section 53a and a CMY data creating section 53b. FIG. 6 shows a data conversion algorithm 60 with one block. It is acceptable that the data conversion algorithm 60 is defined in the personal computer 20 shown in FIG. 2 and FIG. 3. Alternatively it is acceptable that the data conversion algorithm 60 is defined in another personal computer, and the first K-function creating section 54 and the second K-function creating section 56 perform the communication with the another personal computer to use the data conversion algorithm 60. Here, for the purpose of simplification, it is assumed that the data conversion algorithm 60 is defined in the same personal computer as the personal computer 20 shown in FIG. 2 and FIG. 3, in which the color conversion definition creating apparatus 50 is constructed.

The parameter computing section 51, the first conversion section 52, the second conversion section 53 (the RGB data creating section 53a and the CMY data creating section 53b), the first K-function creating section 54, the first association creating section 55, the second K-function creating section 56, and the second association creating section 57, which constitute the color conversion definition creating apparatus 50, correspond to the parameter computing section 41, the first conversion section 42, the second conversion section 43 (the RGB data creating section 43a and the CMY data creating section 43b), the first K-function creating section 44, the first association creating section 45, the second K-function creating section 46, and the second association creating section 47, which constitute the color conversion definition creating program 40 shown in FIG. 5, respectively. It is noted, however, that the elements shown in FIG. 6 are constructed by a combination of the hardware of the personal computer 20 shown in FIG. 2 and FIG. 3 with OS (operation system) and application program to be executed in the personal computer 20, while the elements of the color conversion definition creating program 40 shown in FIG. 5 are constructed by only the application program.

The functions of the respective elements of the color conversion definition creating apparatus 50 are the same as those of the associated elements of the color conversion definition creating program 40 shown in FIG. 5 when the color conversion definition creating program 40 is installed in the personal computer 20 shown in FIG. 2 and FIG. 3 and executed. Thus, detailed explanations of the functions of the respective elements of the color conversion definition creating apparatus 50 will be made later together with the functions of the respective steps of the color conversion definition creating method of FIG. 4 and the functions of the respective elements of the color conversion definition creating program 40 of FIG. 5. Also detailed explanation of the data conversion algorithm 60 shown in FIG. 6 will be made later.

Next, there will be described the steps of the color conversion definition creating method of FIG. 4, the program parts of the color conversion definition creating program 40 of FIG. 5, and the sections of the color conversion definition creating apparatus shown in FIG. 6.

The program parts of the color conversion definition creating program 40 of FIG. 5, and the sections of the color conversion definition creating apparatus shown in FIG. 6 are associated with the steps of the color conversion definition creating method of FIG. 4, respectively. Hereinafter, there will be explained the steps of the color conversion definition creating method of FIG. 4. The explanation of the steps of the color conversion definition creating method of FIG. 4 will serve as the explanation of the program parts of the color conversion definition creating program 40 of FIG. 5, and the explanation of the sections of the color conversion definition creating apparatus shown in FIG. 6.

In the parameter computing step (step a) of the color conversion definition creating method of FIG. 4, a parameter for converting calorimetric data into primary colors RGB data is computed in the manner as set for below.

This parameter computing step is not always needed for the present invention. In the event that the parameter is already computed, it is effective that the parameter is obtained.

As a typical example of the color system representative of calorimetric data, there exists, for example, L*a*b* and the like besides XYZ. Those can be converted into XYZ uniquely. Here, XYZ is dealt with.

Conversion from XYZ data into primary colors RGB data is performed in accordance with formula (1) set forth below. Where elements $A_{ij}$ (i, j=1, 2, 3) of a matrix $(A_{ij})$ in the formula (1) are parameters to be determined.

$$\begin{bmatrix} R \\ G \\ B \end{bmatrix} = \begin{bmatrix} A_{11} & A_{12} & A_{13} \\ A_{21} & A_{22} & A_{23} \\ A_{31} & A_{32} & A_{33} \end{bmatrix} \begin{bmatrix} X \\ Y \\ Z \end{bmatrix} \quad (1)$$

Figure 7:
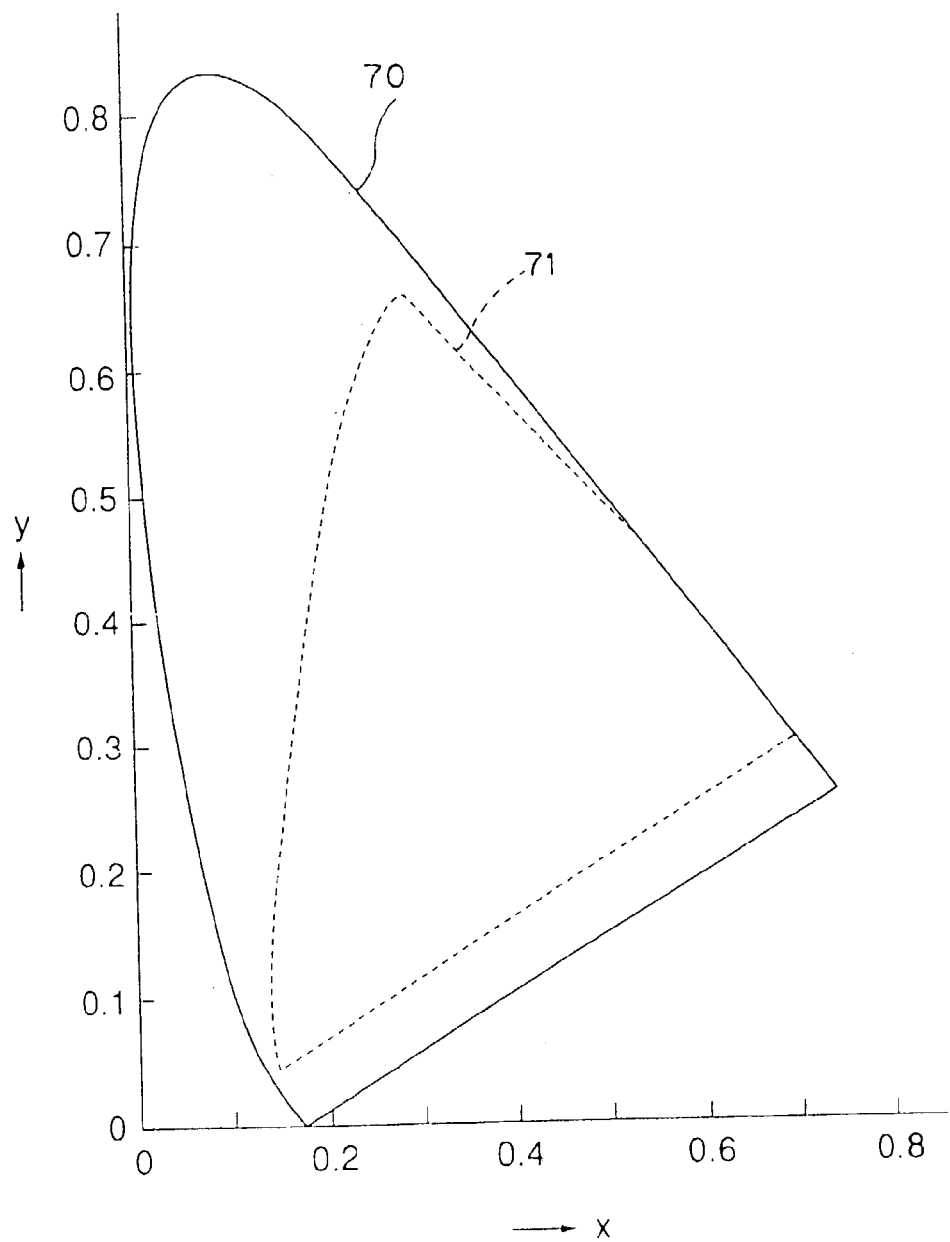
FIG. 7 is an explanatory view useful for understanding x-y chromaticity diagram.
Figure 8:
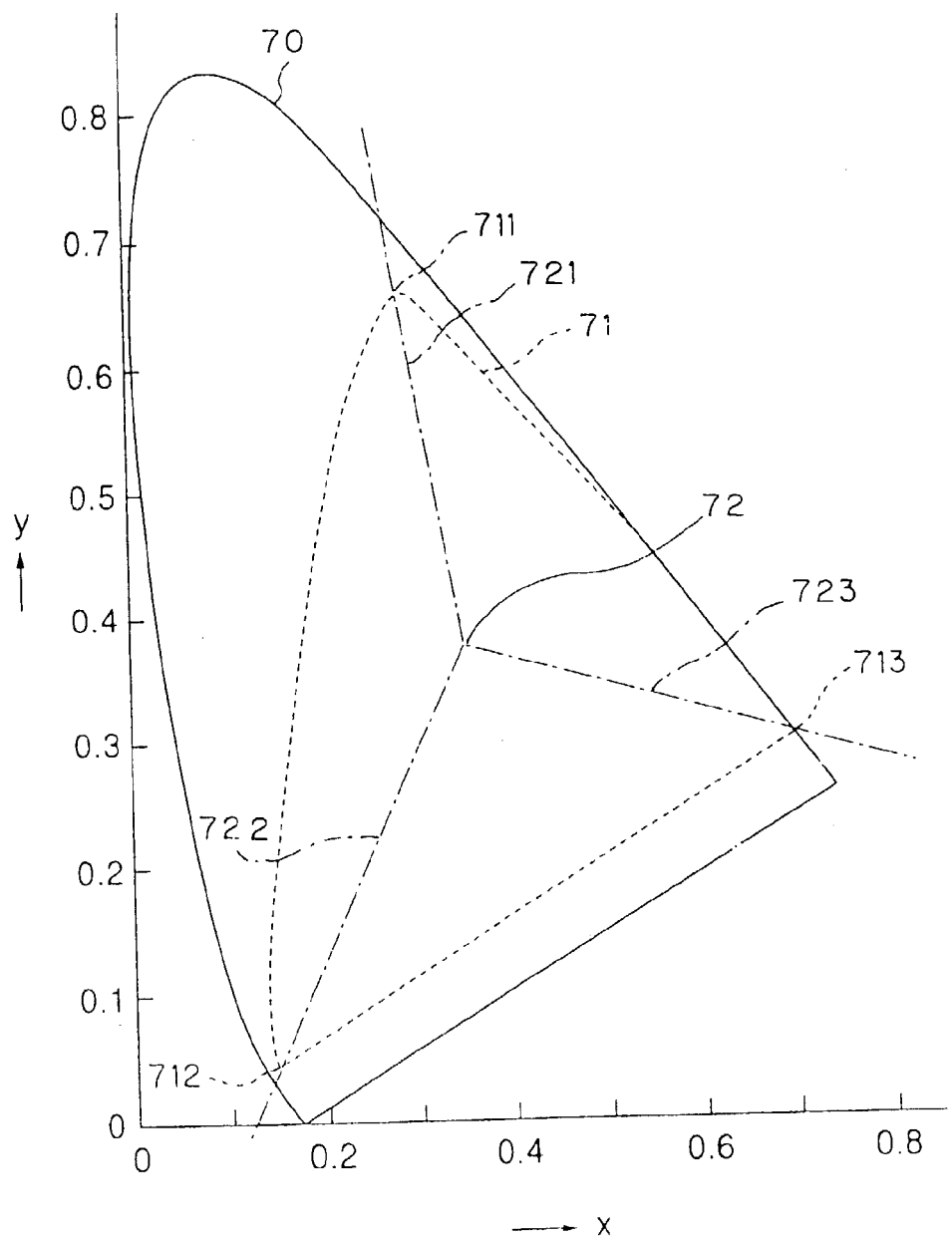
FIG. 8 is an explanatory view useful for understanding x-y chromaticity diagram.
Figure 9:
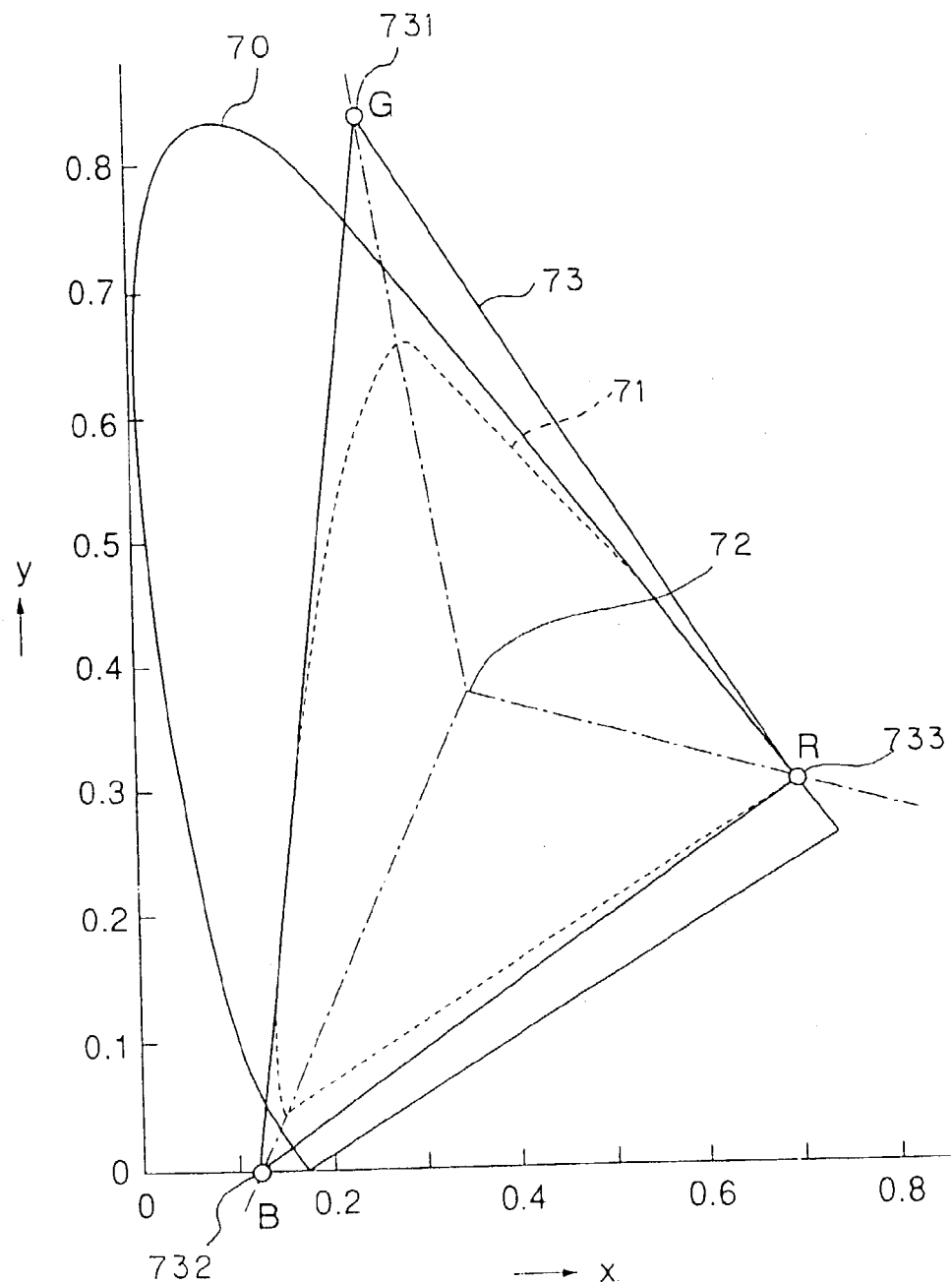
FIG. 9 is an explanatory view useful for understanding x-y chromaticity diagram.

FIG. 7 to FIG. 9 are explanatory views useful for understanding x-y chromaticity diagrams.

FIG. 7 shows a reproducible color gamut 71 in a full color gamut 70 encircling the whole area of existing colors. The reproducible color gamut 71 is an area encircling a large number of points (for example, 729 points) on x-y chromaticity diagram determined from calorimetric data of XYZ obtained in such a manner that there is created a color chart consisting of a large number (for example, 729 colors) of color patches, which is of the maximum capable of being represented as colors on a reversal film of the same characteristics as a reversal film on which an original image as the source of creation of the RGB data shown in FIG. 1 is recorded, and the color chart is measured by a calorimeter.

The reason why the reproducible color gamut of the reversal film is adopted is that the reversal film is a recording medium having a considerably broad reproducible color gamut of the various recording mediums capable of recording images. It is noted that an adoption of the reversal film simply implies a typical example, and it is acceptable that recording mediums besides the reversal film or a reproducible color gamut of a calorimetric system is adopted.

Colorimetric data for XYZ and coordinates points (x, y) on x-y chromaticity diagram are expressed with the following relation.

$$x = X/(X+Y+Z) \quad (2)$$
$$y = Y/(X+Y+Z)$$

Z chromaticity value is expressed by $$z=1-x-y=Z/(X+Y+Z) \quad (3)$$

Z chromaticity value is not necessary for notation of x-y chromaticity diagrams of FIG. 7 to FIG. 9, but is necessary for the computation, which will be described later.

Next, as shown in FIG. 8, a predetermined white point is determined on the x-y chromaticity diagram. According to the present embodiment, the following point $(x_w, y_w)$ representative of the chromaticity value of light $D_{50}$ of the auxiliary standard of CIE is established as a white point 72.

$$(x_w, y_w)=(0.3457, 0.3586) \quad (4)$$

Next, let us consider on the x-y chromaticity diagram three straight lines 721, 722 and 723 coupling the white point 72 with coordinates points 711, 712 and 713 (vertexes of the triangle of the reproducible color gamut 71) corresponding to the primary colors of the reproducible color gamut 71, respectively, and as shown in FIG. 9, a triangle 73 having vertexes on the three straight lines and including the reproducible color gamut 71. It is preferable that the triangle 73 includes the reproducible color gamut 71 and has the minimum area.

According to the present embodiment, the vertexes of the triangle 73 thus established are expressed by primary color points 731, 732 and 733 representative of the chromaticity values of the primary colors for R, G and B.

From the white point 72 and three primary color points 731, 732 and 733 thus determined, the elements $A_{ij}$ of the matrix $(A_{ij})$ shown in the formula (1) is determined in the manner as set forth below (cf. Mituo Ikeda: Fundamentals of color engineering science, pp. 125–130, Asakura Bookstore).

Here, xyz chromaticity values (x, y, z) of the white point 72 is expressed by $(x_w, y_w, z_w)$, and xyz chromaticity values of the primary colors points 731, 732 and 733 are expressed by $(x_G, y_G, z_G)$, $(x_B, y_B, z_B)$ and $(x_R, y_R, z_R)$, respectively.

Formula (1) is expressed by $$R = A_{11}X + A_{12}Y + A_{13}Z \quad (5)$$
$$G = A_{21}X + A_{22}Y + A_{23}Z$$
$$B = A_{31}X + A_{32}Y + A_{33}Z$$

(a) With respect to white point $(x_w, y_w, z_w)$ $$A_{11}x_w + A_{12}y_w + A_{13}z_w = 1 \quad (6)$$
$$A_{21}x_w + A_{22}y_w + A_{23}z_w = 1$$
$$A_{31}x_w + A_{32}y_w + A_{33}z_w = 1$$

(b) With respect to primary colors point $(x_G, y_G, z_G)$ for G, $$A_{11}x_G + A_{12}y_G + A_{13}z_G = 0 \quad (7)$$
$$A_{31}x_G + A_{32}y_G + A_{33}z_G = 0$$

(c) With respect to primary colors point $(x_B, y_B, z_B)$ for B, $$A_{11}x_B + A_{12}y_B + A_{13}z_B = 0 \quad (8)$$
$$A_{21}x_B + A_{22}y_B + A_{23}z_B = 0$$

(d) With respect to primary colors point $(x_R, y_R, z_R)$ for R, $$A_{21}x_R + A_{22}y_R + A_{23}z_R = 0 \quad (9)$$
$$A_{31}x_R + A_{32}y_R + A_{33}z_R = 0$$

Those relations are applied.

Those formulas (6) to (9) includes, taking notice of the formulas including $A_{11}, A_{12}, A_{13}$, for instance, the following three formulas:

$$A_{11}x_w + A_{12}y_w + A_{13}z_w = 1$$
$$A_{11}x_G + A_{12}y_G + A_{13}z_G = 0$$
$$A_{11}x_B + A_{12}y_B + A_{13}z_B = 0$$

Solving simultaneous equations of those three formulas makes it possible to determine $A_{11}, A_{12}$, and $A_{13}$. In the same way as this, those formulas (6) to (9) includes three formulas including $A_{21}, A_{22}$, and $A_{23}$, and three formulas including $A_{31}, A_{32}$, and $A_{33}$. Solving simultaneous equations of those formulas makes it possible to determine all elements $A_{ij}$ (i, j=1, 2, 3) of the matrix $(A_{ij})$ shown in the formula (1). According to the present embodiment, the elements $A_{ij}$ are parameters to be determined in the parameter computing step (step a) in FIG. 4.

While the above-mentioned example considerably strictly determines the white point and the primary colors points, it is acceptable that the elements of the matrix in the formula (1) are determined in accordance with points determined on an experimental basis in some extent omitting the steps involved in the strict determination of the white point and the primary colors points. In this case, however, as compared with a case where the white point and the primary colors points are strictly determined in the manner as mentioned above, accuracy of the final color processing will be lowered, or in order to prevent accuracy of the color processing from being lowered, there is a possibility that it imposes on an operator burdens.

In the parameter computing step (step a) in FIG. 4, the parameters (according to the example as mentioned above, elements $A_{ij}$ of the matrix $(A_{ij})$ shown in the formula (1)) are computed in the manner as mentioned above. The parameters thus computed are saved for the purpose of processing in the RGB data creating step (step c1) of the second conversion step (step c) of the color conversion definition creating method in FIG. 4.

Incidentally, as mentioned above, when the parameters are already computed, the parameter computing step (step a) is unnecessary.

The first conversion process (step b) of the color conversion definition creating method in FIG. 4 converts RGB data for a printer into calorimetric data (XYZ) for device non-dependence in accordance with a printer profile representative of color reproduction characteristic of the printer 11 shown in FIG. 1.

Figure 10:
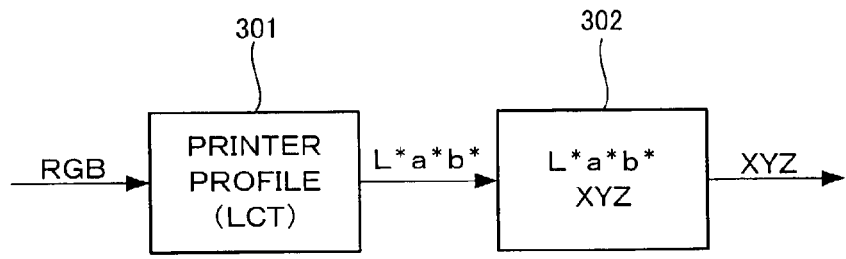
FIG. 10 is a conceptual view useful for understanding processing in a first conversion process (step b).

FIG. 10 is a conceptual view useful for understanding processing in the first conversion step (step b).

First, RGB data is converted into calorimetric data L*a*b* in accordance with a profile (printer profile 301) representative of color conversion characteristics of the printer 11 in FIG. 1, which is determined in form of LUT (look-up table) type of data. It is well known how the printer profile is determined. Thus, the explanation will be omitted. There is no need to determine the printer profile per se in the first conversion process (step b), and it is acceptable that the printer profile is obtained together with RGB data representative of the printed image 11a in FIG. 1, or alternatively separately.

It is noted that the RGB data shown in FIG. 10 is not the RGB data representative of the printed image 11a, but is RGB data on all the lattice points mechanically generated.

After the RGB data is converted into the calorimetric data L*a*b* in accordance with the printer profile 301, the calorimetric data L*a*b* is converted into calorimetric data XYZ in accordance with transformation 302 from L*a*b* to XYZ. Transformation from L*a*b* to XYZ is performed unequivocally and reversibly. Transformation from L*a*b* to XYZ is also well known, and thus the explanation will be omitted.

In this manner, the first conversion step (step b) in FIG. 4 converts the RGB data for a printer into the calorimetric data XYZ.

Next, the second conversion step (step c) in FIG. 4 converts the XYZ data thus determined into CMY data.

Figure 11:
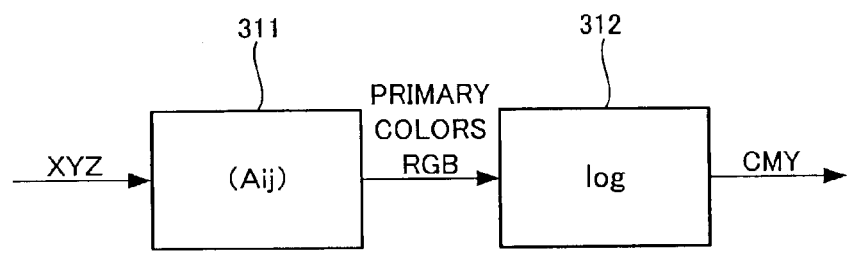
FIG. 11 is a conceptual view useful for understanding processing in a second conversion process (step c).

FIG. 11 is a conceptual view useful for understanding processing in the second conversion step (step c).

The second conversion step (step c) comprises the RGB data creating step (step c1) and the CMY data creating step (step c2). The RGB data creating step (step c1) performs data conversion 311 according to formula (1) using the parameters $(A_{ij})$ determined in the parameter computing step (step a), so that XYZ data is converted into primary colors RGB data.

Further, in the CMY data creating step (step c2) of the second conversion step (step c), the primary colors RGB data is converted into the CMY data in accordance with a logarithmic transformation 312 according to formula (10) set forth below.

$$C = -\log R \quad (10)$$

$$M = -\log G$$

$$Y = -\log B$$

CMY thus determined are referred to as block CMY. Here, in order to clarify that the CMY data thus determined is CMY data represented by the block CMY, this CMY data is referred to as $C_b M_b Y_b$ data.

Next, the first K-function creating step (step d) determines a first K-function from data of $C_b=M_b=Y_b$ (gray axis) of the $C_b M_b Y_b$ determined in the second conversion step (step c), in accordance with the data conversion algorithm 60 with one block shown in FIG. 6. Details of the data conversion algorithm 60 will be described later.

According to the present embodiment, as the first function of K, there is determined a function $K=K_{out}(C_{out})$ of $K_{out}$ wherein $C_{out}$ of CMYK data (this is referred to as $C_{out} M_{out} Y_{out} K_{out}$ data) determined from $C_b M_b Y_b$ data in accordance with the data conversion algorithm 60 is a variable. However, there is no need that the first function of K is one wherein $C_{out}$ is a variable, and it is acceptable that the first function of K is one wherein $M_{out}$ or $Y_{out}$ is a variable.

When the first function $(K_1=K_{out}(C_{out}))$ of K is determined, the data conversion algorithm 60 is set up with a color conversion parameter (the first color conversion parameter referred to in the present invention) customized by a skilled person for color operation, which is capable of converting the $C_b M_b Y_b$ data into the CMYK data having the printing aptitude.

Now the detailed description for the steps of the color conversion definition creating method in FIG. 4 will interrupt, and hereinafter, there will be described in detail the data conversion algorithm 60 shown in FIG. 6.

Figures 12A, 12B:
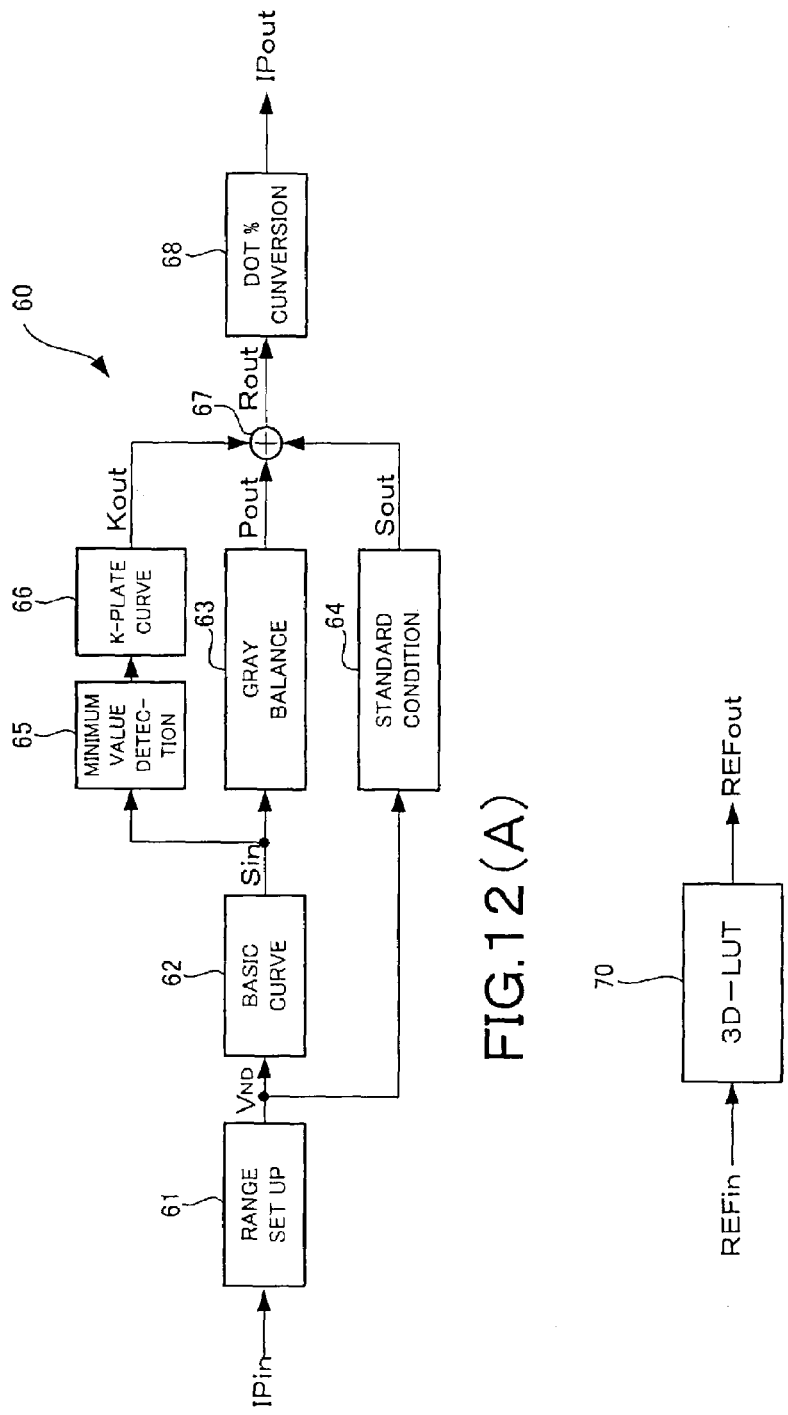
FIG. 12(A) is a block diagram useful for understanding details of data conversion algorithm shown in FIG. 6 with one block.
FIG. 12(B) is a 3D-LUT (three-dimensional Look-Up Table) for converting CMY data into CMYK data, which is adjusted by a skilled person of a color operation.

FIG. 12(A) is a block diagram useful for understanding details of data conversion algorithm 60 shown in FIG. 6 with one block. FIG. 12(B) is a 3D-LUT (three-dimensional Look-Up Table) for converting CMY data into CMYK data, which is adjusted by a skilled person of a color operation.

While the data conversion algorithm referred to in the present invention is not restricted to the structure shown in FIG. 12(A), there will be explained, by way of example, the data conversion algorithm having the structure shown in FIG. 12(A).

It is assumed that there is already constructed 3D-LUT 70 for converting CMY data into CMYK data having a printing aptitude to the printing system and taking in views of skilled persons for color customization and printing companies for colors (those are referred to as "taste"), that is, which is not always coincident with the original image in color. While the construction way of the 3D-LUT 70 is not restricted to the specified way, it is acceptable that a way disclosed in for example Japanese Patent Application No. 2001-291691 is adopted to construct 3D-LUT 70 including the "taste". The data conversion algorithm 60 shown in FIG. 6 is also used in the second K-function creating step (step f), upon replacement of the color conversion parameters of the data conversion algorithm 60 by the second color conversion parameters based on the first association (which will be described later) determined the first association creating step (step e), as well as the first K-function creating step (step d) of the color conversion definition creating method in FIG. 4.

When data conversion algorithm is used in the first K-function creating step (step d), it is possible to use 3D-LUT 70 in FIG. 12(B) as it is, as the data conversion algorithm, but the use of 3D-LUT 70 alone makes it difficult to replace the color conversion parameters.

Here, there will be described a way of determining color conversion parameters to be set up on elements, of the data conversion algorithm 60 separated from the 3D-LUT 70 into a plurality of elements as shown in FIG. 12(A). The way, which will be described hereinafter, is a way disclosed in the above-referenced Japanese Patent Application No. 2001-291691.

The data conversion algorithm 60 shown in FIG. 6 comprises, as shown in FIG. 12(A), a range set up 61, a basic curve 62, a gray balance 63, a standard condition 64, a minimum value detection 65, a K-plate curve 66, an addition 67, and a dot % conversion 68. Of those elements, the range set up 61, the basic curve 62, the gray balance 63, the standard condition 64, the K-plate curve 66, and the dot % conversion 68, excepting the minimum value detection 65 and the addition 67, are set up with parameters for a color conversion, so that data processing for the color conversion is performed in accordance with the parameter set up. The minimum value detection 65 and the addition 67 are not set up with parameters. The minimum value detection 65 detects the minimum value of the entered three data of C, M and Y. The addition 67 adds output $P_{out}$ of the gray balance 63, output $S_{out}$ of the standard condition 64, and output $K_{out}$ of the K-plate curve 66 for each color of C, M, Y and K, and generates addition value $R_{out}$ for each color of C, M, Y and K.

Here, for the purpose of the distinction on the notation between the input data and the output data in FIG. 12(B), the input data $(C_b, M_b, Y_b)$ to the data conversion algorithm 60 is denoted as $IP_{in}$, and the output data $(C_{out}, M_{out}, Y_{out}, K_{out})$ from the data conversion algorithm 60 is denoted as $IP_{out}$.

The input data $(C_b, M_b, Y_b)$ and the output data $(C_{out}, M_{out}, Y_{out}, K_{out})$ of the 3D-LUT 70 shown in FIG. 12(B) are denoted as $REF_{in}$ and $REF_{out}$, respectively.

The color conversion parameters to be set to the respective sections of the data conversion algorithm 60 shown in FIG. 12(A) are determined in accordance with the 3D-LUT 70 which is already determined.

FIG. 13A, FIG. 13B, FIG. 13C, and FIG. 13D show curves $C_{out}$, $M_{out}$, $Y_{out}$, and $K_{out}$ on $C_{out} M_{out} Y_{out}$ and $K_{out}$ color coordinates systems associated with gray axes of $C_b=M_b=Y_b$, of 3D-LUT 70 shown in FIG. 12(B), respectively. Here, the minus portion of the curve $K_{out}$ is a curve inserted from the plus portion.

First, $C_b M_b Y_b$ data on the gray axes of $C_b=M_b=Y_b$, of $C_b M_b Y_b$ color coordinates systems of the input side $(REF_{in})$ of the 3D-LUT 70 are converted by the 3D-LUT 70 to obtain curves of $C_{out}$, $M_{out}$, $Y_{out}$, and $K_{out}$ on $C_{out} M_{out} Y_{out}$ and $K_{out}$ color coordinates systems of the output side $(REF_{out})$ as shown in FIG. 13A, FIG. 13B, FIG. 13C, and FIG. 13D.

FIG. 13A, FIG. 13B, FIG. 13C, and FIG. 13D show dot % set up, that is, 3% at the high light (HL) side, 95% at the shadow (SH) side, regarding C; 3% at the HL side, 88% at the SH side, regarding M; 3% at the HL side, 88% at the SH side, regarding Y; and −15% at the HL side, 75% at the SH side, regarding K, respectively.

Those set up dot % are designated by a printing company, and establish standards for HL and SH for each color of C, M, Y and K.

Here, the set up dot % for HL and SH for each color of C, M, Y and K are applied to the associated curves, respectively, so that set up densities for HL and SH for each color of C, M, Y and K are determined, as shown in the figures.

The set up densities of HL/SH for C, M, Y and K are denoted by $D_{HLC}/D_{SHC}$, $D_{HLM}/D_{SHM}$, $D_{HLY}/D_{SHY}$, $D_{HLK}/D_{SHK}$, respectively.

Figure 14A:
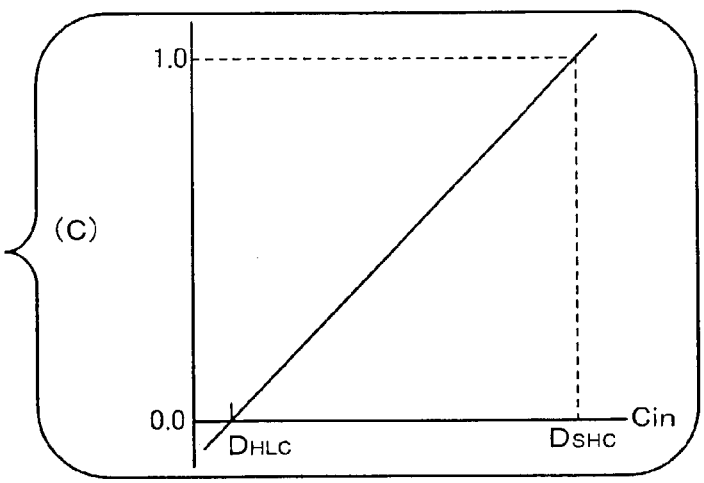
FIG. 14A, FIG. 14B, and FIG. 14C show range set up parameters for normalizing $C_{in}$, $M_{in}$, and $Y_{in}$, respectively.
Figure 14B:
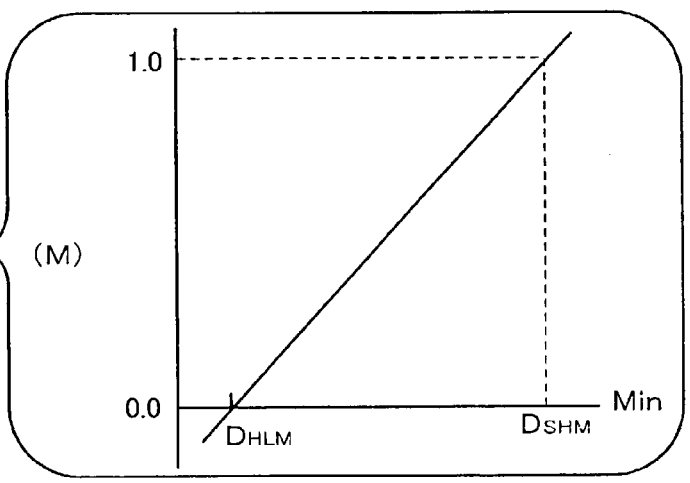
Figure 14C:
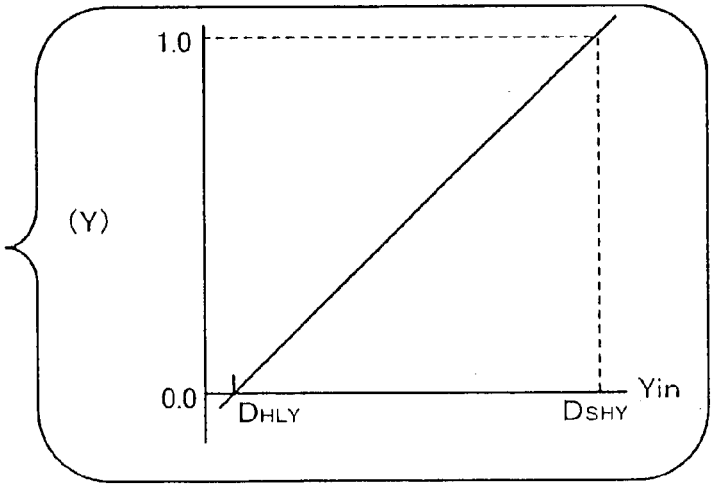

FIG. 14A, FIG. 14B, and FIG. 14C show range set up parameters for normalizing $C_{in}$, $M_{in}$, and $Y_{in}$, respectively.

FIG. 14A, FIG. 14B, and FIG. 14C show range set up parameters of C, M, and Y, respectively, and parameters for range setting (normalizing) $C_{in}$, $M_{in}$, and $Y_{in}$, to values of 0.1 to 1.0 in such a manner that set up dot % at the high light (HL) side and set up dot % at the shadow (SH) side, which are explained referring to FIG. 13A, FIG. 13B, FIG. 13C, and FIG. 13D, are associated with 0.0 and 1.0 on C, M and Y, respectively.

Those range set up parameters of C, M, and Y are set to the range set up 61 in FIG. 12(A), and are used for range setting (normalization) of data for $C_b$, $M_b$ and $Y_b$ fed to the data conversion algorithm 60. Those range set up parameters of C, M, and Y are one of the color conversion parameters referred to in the present invention.

Incidentally, since the data conversion algorithm 60 does not receive data for K, the range set up parameter as to K is unnecessary.

Figure 15:
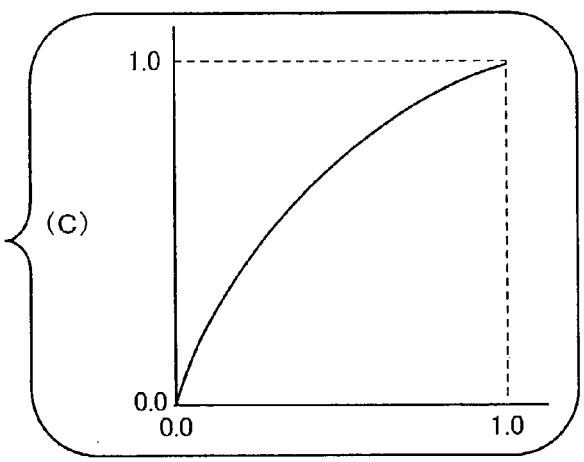
FIG. 15 is a view showing a basic curve.

FIG. 15 is a view showing a basic curve.

Figure 13A:
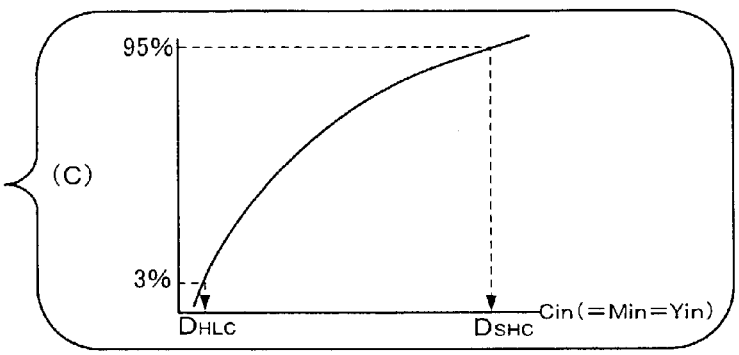
FIG. 13A, FIG. 13B, FIG. 13C, and FIG. 13D show curves $C_{out}$, $M_{out}$, $Y_{out}$, and $K_{out}$ on $C_{out}$ $M_{out}$ $Y_{out}$ and $K_{out}$ color coordinates systems associated with gray axes of $C_b=M_b=Y_b$, of 3D-LUT 70 shown in FIG. 12(B), respectively.

The basic curve is obtained in such a manner that the set up densities $D_{HLC}/D_{SHC}$ of HL/SH of the horizontal axis of FIG. 13(A) are associated with 0.0/1.0, respectively, and 3%/95%, which are set up dot % of HL/SH of the vertical axis, are associated with 0.0/1.0, respectively, so that the curve of FIG. 13(A) is normalized. According to the present embodiment, the curve of C thus normalized is established as the basic curve. Incidentally, it is acceptable that besides C, the curve of M or Y normalized in a similar fashion to that of C as mentioned above is established as the basic curve. Alternatively, it is acceptable that the average normalized curve on C, M and Y is established. However, regarding K, the geometry of the curve is greatly different from C, M and Y, and thus it should be avoided that the curve of K normalized is established as the basic curve.

Thus, the curve of C normalized is established as the basic curve, and the basic is set to the basic curve 62 shown in FIG. 12(A). This basic curve is also one of the color conversion parameters referred to in the present invention.

FIG. 16A, FIG. 16B, FIG. 16C, and FIG. 16D are explanatory views useful for understanding as to how to determine a gray balance.

Figure 16A:
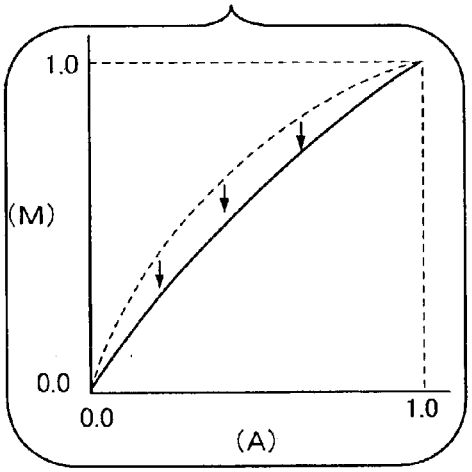
FIG. 16A, FIG. 16B, FIG. 16C, and FIG. 16D are explanatory views useful for understanding as to how to determine a gray balance.
Figure 16B:
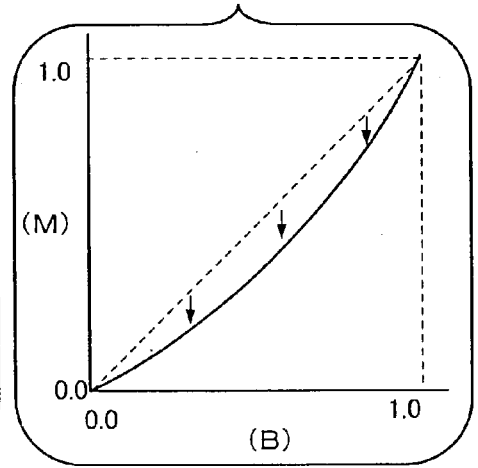
Figure 16C:
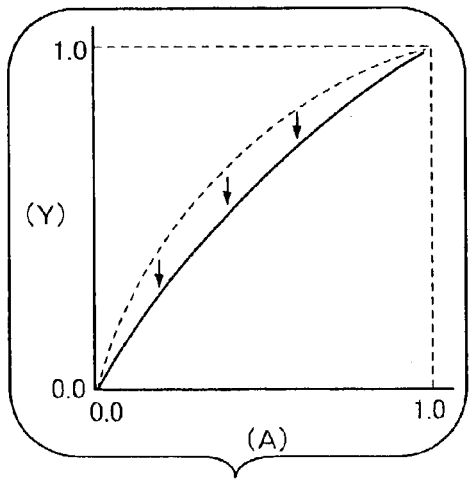

Solid curves shown in FIG. 16A and FIG. 16C show normalized curves obtained on M and Y, respectively, in a similar fashion to that mentioned above.

Figure 13B:
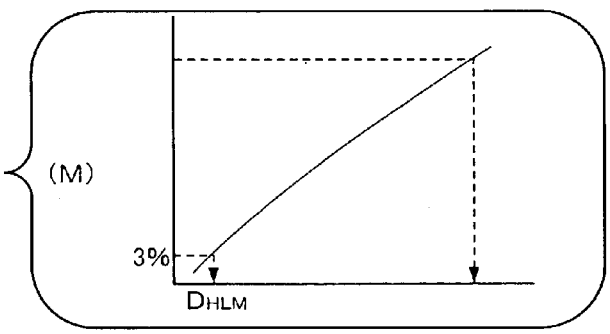
Figure 13C:
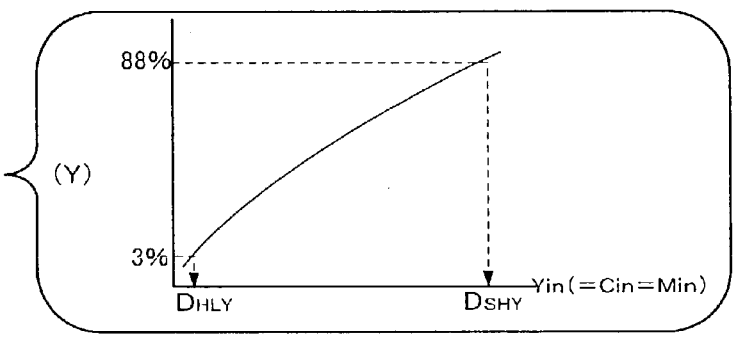

The solid curve of FIG. 16A is obtained when the set up densities $D_{HLM}/D_{SHM}$ of HL/SH of the horizontal axis of FIG. 13(B) are associated with 0.0/1.0, respectively, and 3%/88%, which are set up dot % of HL/SH of the vertical axis, are associated with 0.0/1.0, respectively. The solid curve of FIG. 16C is obtained when the set up densities $D_{HLY}/D_{SHY}$ of HL/SH of the horizontal axis of FIG. 13(C) are associated with 0.0/1.0, respectively, and 3%/88%, which are set up dot % of HL/SH of the vertical axis, are associated with 0.0/1.0, respectively.

Curves of broken lines shown in FIG. 16A and FIG. 16C show basic curves (normalized curves of C) shown in FIG. 15.

Figure 16D:
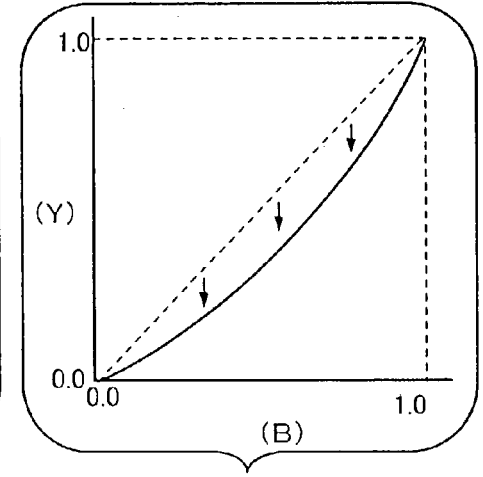

Regarding values between 0.0 and 1.0 of the horizontal axis, the normalized curve of M (FIG. 16A) and the normalized curve of Y (FIG. 16C) are subtracted from the basic curve (the normalized curve of C) to determine the differences, respectively, and then as shown in FIG. 16B and FIG. 16D, there are obtained downward convex curves wherein only the differences determined in the manner as mentioned above are subtracted from the straight lines of broken lines of a slope of 45 degrees. The curves shown by the solid lines in FIG. 16B and FIG. 16D, which are determined in the manner as mentioned above as to M and Y, are gray balances representative of differences from the basic curve with respect to M and Y, respectively. And thus those curves are set to the gray balance 63 shown with one block in FIG. 12(A). The curves of those gray balances of M and Y are also one of the color conversion parameters referred to in the present invention.

Incidentally, according to the present embodiment, the normalized curve as to C is established as the basic curve, and thus the gray balance as to C offers 0 extending over overall extent of 0.0 to 1.0 of the horizontal axis. Accordingly, set up to the gray balance 63 is unnecessary. However, in the event that a curve other than the normalized curve of C, for example, an average curve of normalized curves of C, M and Y is established as the basic curve, there occur parameters of the gray balance as to C, too.

Figure 17A:
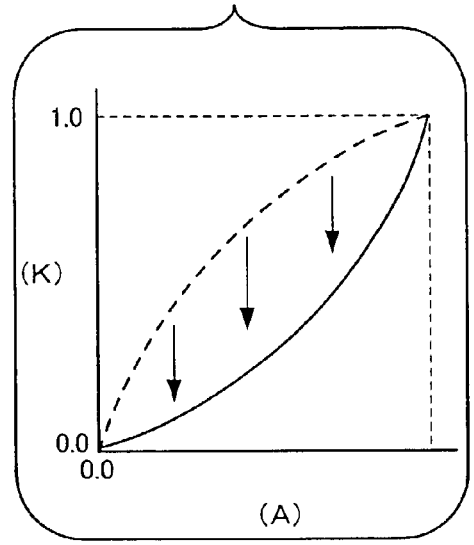
FIG. 17A and FIG. 17B are explanatory views useful for understanding as to how to determine a K-plate curve.
Figure 17B:
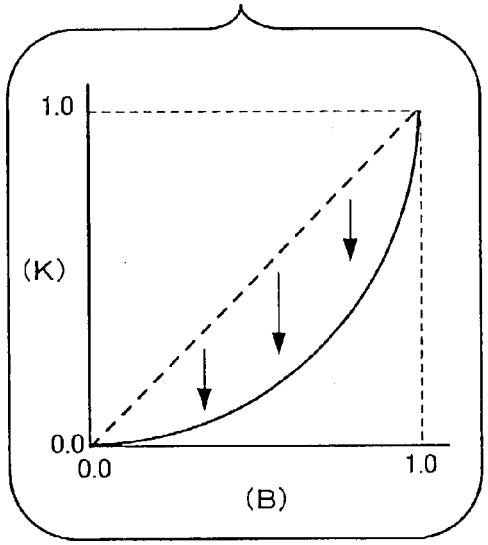

FIG. 17A and FIG. 17B are explanatory views useful for understanding as to how to determine a K-plate curve.

A way of determining a K-plate curve is same as that of the gray balances for M and Y shown in FIG. 16A, FIG. 16B, FIG. 16C, and FIG. 16D.

Figure 13D:
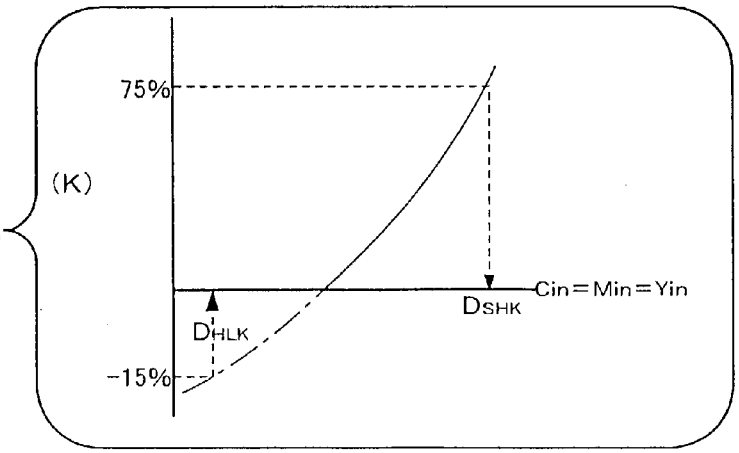

Curves of broken lines shown in FIG. 17A show basic curves (normalized curves of C) shown in FIG. 15. The solid curve of FIG. 17A is a normalized curve obtained in such a manner that the set up densities $D_{HLK}/D_{SHK}$ of HL/SH of the horizontal axis of FIG. 13(D) are associated with 0.0/1.0, respectively, and −15%/75%, which are set up dot % of HL/SH of the vertical axis, are associated with 0.0/1.0, respectively.

At the respective points between 0.0 and 1.0 of the horizontal axis, as shown with downward arrows in FIG. 17A, a difference between the basic curve (the normalized curve of C) and the normalized curve of K is determined, and then as shown in FIG. 17B, there is obtained a downward convex curve wherein only the differences determined in the manner as mentioned above is subtracted from the straight lines of a broken line of a slope of 45 degrees. This curve is set to the K-plate curve 66 shown in FIG. 12(A). The K-plate curve 66 is also one of the color conversion parameters referred to in the present invention.

There will be described later an explanation as to how the standard condition 64 is determined, and next there will be explained parameters to be set to the dot % conversion 68 in FIG. 12(A).

FIG. 18A, FIG. 18B, FIG. 18C, and FIG. 18D show parameters to be set to the dot % conversion 68 in FIG. 12(A).

$IP_{in}$ in FIG. 12(A), that is, input data for $C_b$, $M_b$ and $Y_b$, is normalized by the range set up 61 shown in FIG. 12(A) to values of 0.0–1.0 in accordance with parameters shown in FIG. 14A to FIG. 14C, and then the basic curve 62 and the gray balance 63 perform data processing with the values normalized to 0.0–1.0 as they are. Thus, the dot % conversion 68 in FIG. 12(A) converts values of 0.0–1.0 into the dot % in accordance with the parameters shown in FIG. 18A, FIG. 18B, FIG. 18C, and FIG. 18D.

Figure 18A:
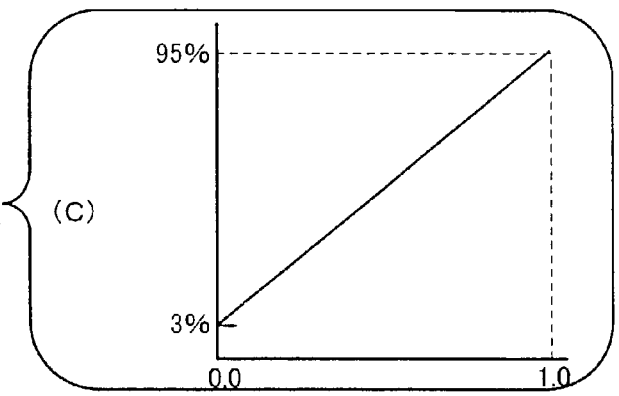
FIG. 18A, FIG. 18B, FIG. 18C, and FIG. 18D show parameters to be set up in dot % conversion in FIG. 12(A) and FIG. 12(B).
Figure 18B:
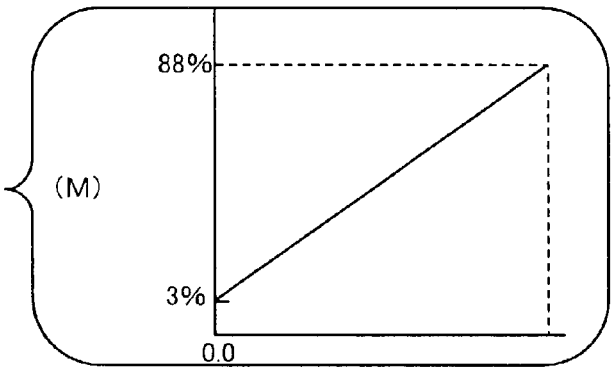
Figure 18C:
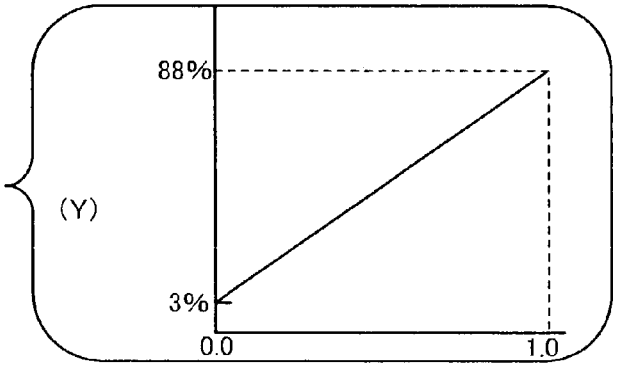
Figure 18D:
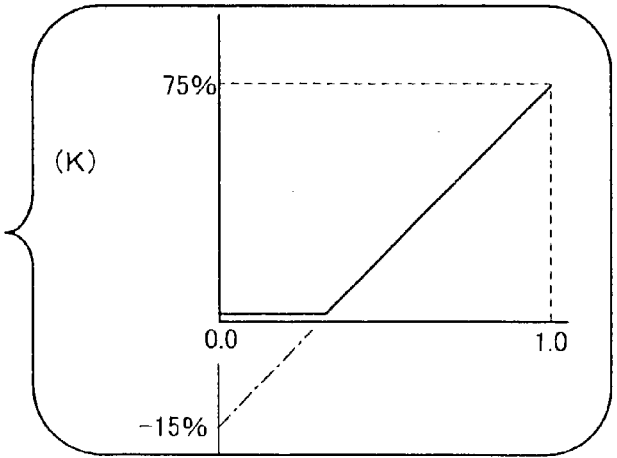

FIG. 18A, FIG. 18B, FIG. 18C, and FIG. 18D show dot % conversion parameters as to C, M, Y and K, respectively. FIG. 18A indicates that values of 0.0–1.0 as to C are converted into the dot % in accordance with the straight line wherein 0.0/1.0 are associated with 3%/95% which are the set up dot % of HL/SH shown in FIG. 13A too, respectively. FIG. 18B indicates that values of 0.0–1.0 as to M are converted into the dot % in accordance with the straight line wherein 0.0/1.0 are associated with 3%/88% which are the set up dot % of HL/SH shown in FIG. 13B too, respectively. FIG. 18C indicates that values of 0.0–1.0 as to Y are converted into the dot % in accordance with the straight line wherein 0.0/1.0 are associated with 3%/88% which are the set up dot % of HL/SH shown in FIG. 13C too, respectively. FIG. 18D indicates that values of 0.0–1.0 as to K are converted into the dot % in accordance with the straight line wherein 0.0/1.0 are associated with −15%/75% which are the set up dot % of HL/SH shown in FIG. 13D too, respectively.

With respect to the dot % set up parameters for K, it is noted that set up dot % is clipped to 0%, since there is no minus dot %.

That is, with respect to K, it is converted into dot % in accordance with a solid line graph shown in FIG. 18D.

The dot % conversion parameters shown in FIG. 18A, FIG. 18B, FIG. 18C, and FIG. 18D are set to dot % conversion 68 shown in FIG. 12(A). According to the present embodiment, those dot % conversion parameters are also ones of the color conversion parameters referred to in the present invention.

While a way as to how to determine the standard condition 64 shown in FIG. 12(A) is not yet explained, it will be described later. Here, there will be described a flow of the color conversion processing along FIG. 12(A).

The color data $IP_{in}$ shown in $C_bM_bY_b$ color coordinates systems are first normalized by the range set up 61 to values of 0.0 to 1.0 along the straight lines shown in FIG. 14A, FIG. 14B and FIG. 14C, respectively, so that data $V_{ND}$ are generated.

Next, data $V_{ND}$ for C, M and Y are converted by the basic curve 62 into data $S_{in}$ for C, M and Y in accordance with the curve shown in FIG. 15. The data $S_{in}$ are fed to the minimum value detection 65, the gray balance 63 and the standard condition 64.

The minimum value detection 65 compares data for C, M and Y constituting the data $S_{in}$ with one another to detect the minimum value. The detected minimum value is fed to the K-plate curve 66. The K-plate curve 66 converts the minimum value on the horizontal axis into a value on the vertical axis in accordance with the curve shown by the solid line in FIG. 17B to provide $K_{out}$ as to K.

Of the data $S_{in}$ entered from the basic curve 62 to the gray balance 63, data for M and Y are converted by the gray balance 63 in accordance with the curves shown by the solid lines in FIG. 16B and FIG. 16D, respectively. According to the present embodiment, since the curve for C is adopted as the basic curve, the gray balance 63 is bypassed for C. An output of the gray balance 63 is referred to as $P_{out}$.

The data $S_{in}$ fed from the basic curve 62 to the standard condition 64 are converted into data $S_{out}$ for C, M, Y and K. With respect to the color conversion parameters to be set to the standard condition 64, it will be described later.

The addition 67 adds the data $K_{out}$, $P_{out}$ and $S_{out}$, which are obtained in the K-plate curve 66, the gray balance 63 and the standard condition 64, respectively, for each color of C, M, Y and K to generate data $R_{out}$ for C, M, Y and K. The $R_{out}$ data are converted by the dot % conversion 68 into dot % for C, M, Y and K in accordance with the straight lines shown in FIG. 18A, FIG. 18B, FIG. 18C, and FIG. 18D, respectively, and then outputted in form of data $IP_{out}$.

The parameters set up to the standard condition 64 are determined in a manner as set forth below. This makes it possible to consider that the relation between the input data $IP_{in}$ and the output data $IP_{out}$ of FIG. 12(A) is equivalent to the relation between the input data $REF_{in}$ and the output data $REF_{out}$ of FIG. 12(B). That is, when the same data as $REF_{in}$ as $IP_{in}$ is inputted, the same data as $REF_{out}$ as $IP_{out}$ is outputted.

Next, there will be explained a way as to how the standard condition of FIG. 12(A) is determined.

Parameters are set up to the standard condition 64 in form of LUT (Look-up table). For this reason, it is desired that an input of the standard condition 64 is data on a lattice. According to the present embodiment, as the input data $S_{in}$ to the standard condition 64, data associated with the whole lattice points are generated, and data on the respective lattice points are reversely converted by the basic curve 62 (a conversion of values on the horizontal axis from values on the vertical axis in FIG. 15), and further reversely converted by the range set up 61 (values on the horizontal axis are determined from values on the vertical axis in accordance with the straight lines in FIG. 14A, FIG. 14B, and FIG. 14C). Thus, there are briefly determined the input data $IP_{in}$ in which the input data $S_{in}$ of the standard condition 64 are values on the lattice.

The range set up 61 is concerned with a straight conversion, and thus there occurs no error on the reverse conversion. On the other hand, the basic curve 62 is concerned with the curve as shown in FIG. 15. While FIG. 15 shows the continuous curve, actually, the curve is concerned with parameters defined by LUT (Look-up table) and the like in form of a set of discrete points. For this reason, conversions of the basic curve 62 in FIG. 12(A) in a reverse direction bring about errors. Thus, next, while the values of the input data $IP_{in}$ briefly determined in the manner as mentioned above are altered little by little, the input data $IP_{in}$, wherein the input values $S_{in}$ of the standard condition 64 are values on the lattice points, are determined, tracing the range set up 61 and the basic curve 62 in the forward direction.

Next, the input data $IP_{in}$ thus determined are used as the input data $REF_{in}$ of 3D-LUT 70 in FIG. 12(B) to convert the input data $REF_{in}$ by the 3D-LUT 70, so that the output data $REF_{out}$ associated with input data $REF_{in}$ are determined.

Next, the output data $REF_{out}$ determined by the 3D-LUT 70 are used as the output data $IP_{out}$ in FIG. 12(A) to perform a reverse conversion (a conversion from dot % on the vertical axes in FIG. 18A, FIG. 18B, FIG. 18C, and FIG. 18D to numerical values on the horizontal axis in FIG. 19) by the dot % conversion 68, so that $REF_{out}$ are determined.

Further, the input values $S_{in}$ of the standard condition 64 on the lattice points thus determined are fed to the minimum value detection 65 to determine $K_{out}$ by the minimum value detection 65 and the K-plate curve 66. And the same input values $S_{in}$ are fed to the gray balance 63 to determine $P_{out}$.

Performing the above-mentioned processing makes it possible to determine $R_{out}$, $K_{out}$ and $P_{out}$. Thus, performing the subtraction of $K_{out}$ and $P_{out}$ from $R_{out}$ for each color of C, M, Y and K makes it possible to determine $S_{out}$. Associating $S_{out}$ with the input values $S_{in}$ of the lattice points of the standard condition 64 makes it possible to determine parameters to be set up to the standard condition 64. Those parameters are also ones of color conversion parameters referred to in the present invention. Setting up the standard condition 64 in the manner as mentioned above makes it possible to implement the same color conversion as the 3D-LUT 70 in FIG. 12(B) as the whole of FIG. 12(A).

Thus, there is determined the color conversion parameters taking in color customizing of the 3D-LUT 70 in FIG. 12(B), which reflects color customizing of a skilled person.

Here, the explanation of the data conversion algorithm 60 with one block in FIG. 6 will be terminated, and next the description returns to the explanation for the steps of the color conversion definition creating method of FIG. 4.

In the first K-function creating step (step d) of the color conversion definition creating method of FIG. 4, $C_b M_b Y_b$ data of the gray axes ($C_b = M_b = Y_b$) of $C_b$, $M_b$, and $Y_b$ color spaces are fed to the data conversion algorithm 60. At this stage, the data conversion algorithm 60 is set up with the color conversion parameters (the first color conversion parameters referred to in the present invention) taking in "taste" determined in the manner as mentioned above.

In the first K-function creating step (step d), $C_b M_b Y_b$ data of $C_b = M_b = Y_b$ are fed to the data conversion algorithm 60 (FIG. 12(A)) to determine $C_{out}$, $M_{out}$, $Y_{out}$ and $K_{out}$ data.

Figure 19:
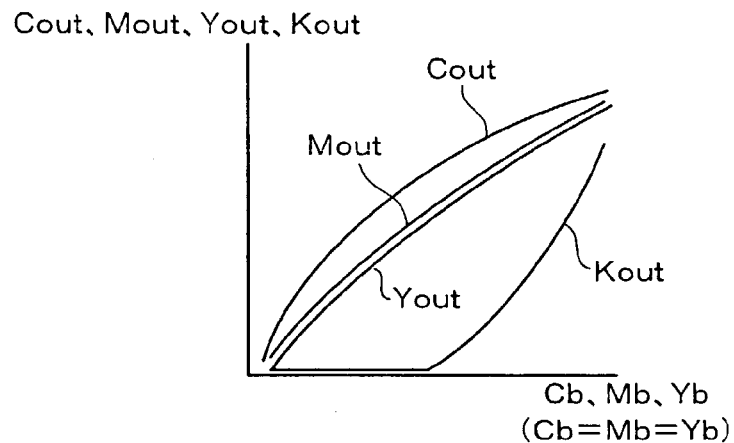
FIG. 19 is a conceptual view showing $C_{out}$ $M_{out}$ $Y_{out}$ and $K_{out}$ data determined by data conversion algorithm to $C_b M_b Y_b$ data (horizontal axis) of ($C_b=M_b=Y_b$).

FIG. 19 is a conceptual view showing $C_{out}$, $M_{out}$, $Y_{out}$ and $K_{out}$ data determined by data conversion algorithm to $C_b M_b Y_b$ data (horizontal axis) of ($C_b = M_b = Y_b$)

In the first K-function creating step (step d), according to the present embodiment, as mentioned above, it is sufficient to determine $K_{out}$, wherein $C_{out}$ is converted, that is, $K_1 = K_{out}$ ($C_{out}$), and it is not always necessary to determine the curves for $M_{out}$ and $Y_{out}$. However, for the purpose of easy understanding, FIG. 19 shows the curves for $M_{out}$ and $Y_{out}$, too.

$K_1 = K_{out}$ ($C_{out}$) thus determined is completely suitable to the printing aptitude of the printing system 12 (cf. FIG. 1) of interest.

When the first K-function creating step (step d) determines K1 = $K_{out}$($C_{out}$), then the first association creating step (step e) determines $C_{out}$, $M_{out}$, $Y_{out}$ and $K_{out}$ data for calorimetric data L*a*b*, which are same as calorimetric data L*a*b* for $C_b M_b Y_b$ data, with respect to $C_b = M_b = Y_b$ (gray axis).

That is, according to the present embodiment, the process goes up the data conversion explained referring to FIG. 10 and FIG. 11: specifically, $C_b M_b Y_b$ data on the lattice points on the gray axes for $C_b M_b Y_b$ color conversion are converted by the inverse function of the logarithmic transformation 312 into the primary colors RGB data; the primary colors RGB data are converted by the data conversion 311 according to formula (1) into the XYZ data; and the XYZ data are converted by the transformation 302 from L*a*b* to XYZ into L*a*b* data.

Next, with respect to $C_{out}$, $M_{out}$, and $Y_{out}$, data on lattices are generated 1% by 1% on ranges of 0% ≤ $C_{out}$ ≤ 100%, 0% ≤ $M_{out}$ ≤ 100%, 0% ≤ $Y_{out}$ ≤ 100%, respectively. And with respect to K, K wherein $C_{out}$ by 1% is a variable is determined in accordance with the function of $K_1 = K_{out}$ ($C_{out}$) generated in the first K-function creating step (step d). all $C_{out}$, $M_{out}$, $Y_{out}$ and $K_{out}$ data thus generated are converted into L*a*b* in accordance with the printing profile.

Figure 20:
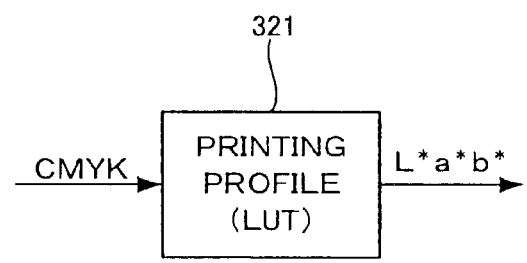
FIG. 20 is a structural view useful for understanding processing of converting CMYK data into L*a*b* data.

FIG. 20 is a structural view useful for understanding processing of converting CMYK data into L*a*b* data.

A printing profile 321 is representative of color reproduction characteristics of the printing system (cf. FIG. 1) of interest and is defined in form of LUT (look-up table).

$C_{out}$, $M_{out}$, $Y_{out}$ and $K_{out}$ data by 1% generated in the manner as mentioned above (but, with respect to $K_{out}$, data determined in accordance with the first function $K_1 = K_{out}$ ($C_{out}$) of K wherein $C_{out}$ by 1% is a variable) are fed to the printing profile 321 to determine L*a*b* data associate with all $C_{out}$, $M_{out}$, $Y_{out}$ and $K_{out}$ data.

Thus, both $C_b M_b Y_b$ data of $C_b = M_b = Y_b$ (gray axis) and all $C_{out}$, $M_{out}$, $Y_{out}$ and $K_{out}$ data are converted into L*a*b*, so that from all $C_{out}$, $M_{out}$, $Y_{out}$ and $K_{out}$ data, $C_{out}$, $M_{out}$, $Y_{out}$ and $K_{out}$ data matched in values of L*a*b* are extracted. According to the preset embodiment, an extent being out of lattice points by 1% of $C_{out}$, $M_{out}$, and $Y_{out}$ is considered as an error, and in the event that there is no data wherein values of L*a*b* are completely matched, $C_{out}$, $M_{out}$, $Y_{out}$ and $K_{out}$ data closest in values of L*a*b* (color difference is small) are extracted as data matched in values of L*a*b*.

Figure 21:
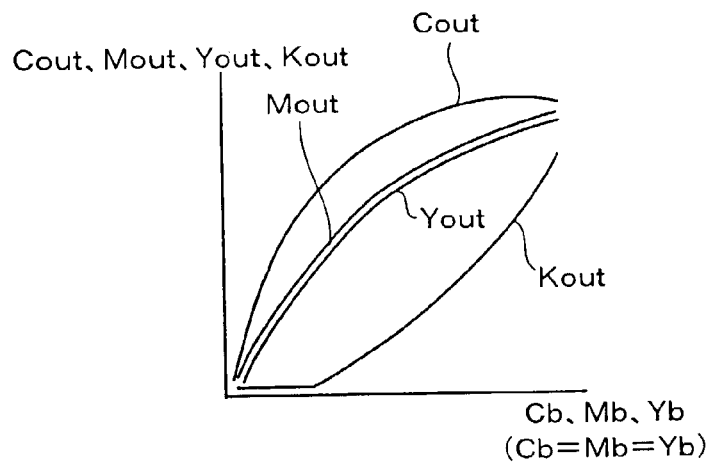
FIG. 21 is a view showing a first association.

FIG. 21 is a conceptual view showing a first association determined by the processing as mentioned above.

FIG. 21 shows the first association between $C_b M_b Y_b$ data of $C_b = M_b = Y_b$ (gray axis) and $C_{out}$, $M_{out}$, $Y_{out}$ and $K_{out}$ data matched to the $C_b M_b Y_b$ data on a colorimetric basis.

While the first association is different in function form as compared with FIG. 19, $K_{out}$ is restricted by the first function $K_1 = K_{out}$ ($C_{out}$) of K determined in accordance with the data conversion algorithm 60 (cf. FIG. 12(A)) in the first K-function creating step (step d). Accordingly, $C_{out}$, $M_{out}$, $Y_{out}$ and $K_{out}$ data, wherein the first association is determined as the restriction condition, have printing aptitude for the printing system 12 (cf. FIG. 1) of interest, and are data of colors matched with colors of $C_b M_b Y_b$ data on a calorimetric basis, too.

Here, however, it is noted that the association is determined on only the gray axis of $C_b = M_b = Y_b$. Next, there will be determined associations of arbitrary combinations of $C_b$, $M_b$ and $Y_b$.

In the second K-function creating step (step f) of the color conversion definition creating method in FIG. 4, there are determined color conversion parameters to be set up to the data conversion algorithm 60 shown in FIG. 12(A).

According to the explanation as to how to determine the color conversion parameters to be set up to the data conversion algorithm 60, the curves of $C_{out}$, $M_{out}$, $Y_{out}$ and $K_{out}$ to the gray axis of $C_b = M_b = Y_b$ are determined from 3D-LUT 70 in FIG. 12(B), taking in the element "taste" (cf. FIG. 13A, FIG. 13B, FIG. 13C, and FIG. 13D), and then the color conversion parameters are determined providing their curves as starting points. However, here, instead of determination from the 3D-LUT 70 in FIG. 12(B), the first association (cf. FIG. 21) determined as mentioned above is adopted to determine the color conversion parameters providing the curves of the first association as starting points. Here, only the curves of the starting points are different, and the way of determining the color conversion parameters is the same as one mentioned above. Thus, redundant explanation will be omitted as to the way of determining the color conversion parameters. The color conversion parameters, which are determined in accordance with the curves of the first association in FIG. 21, are referred to as the second color conversion parameter. The second color conversion parameter thus determined is set up to the data conversion algorithm 60 shown in FIG. 12(A) with replacement for the color conversion parameter (the first color conversion parameter set up).

The curve in FIG. 21 is representative of the association between $C_b M_b Y_b$ data and $C_{out}$, $M_{out}$, $Y_{out}$ and $K_{out}$ data matched to the $C_b M_b Y_b$ data on a calorimetric basis. And with respect to K, the curve in FIG. 21 is determined in accordance with the function relation of $K_1 = K_{out}$ ($C_{out}$) Thus, the curve in FIG. 21 represents $C_{out}$, $M_{out}$, $Y_{out}$ and $K_{out}$ data having the printing aptitude. When the color conversion parameters (the second color conversion parameter) is determined in accordance with the curve in FIG. 21 to be set up to the data conversion algorithm 60, it is possible to determine the color conversion parameters involving no influence of "taste", with respect to K. However, as seen from the above-mentioned way of determining the color conversion parameters, the color conversion parameters of the standard condition 64 in FIG. 12(A) is determined in such a manner that the association between $IP_{in}$ and $IP_{out}$ in FIG. 12(A) is coincident with the association between $REF_{in}$ and REF$_{out}$ in FIG. 12(B). For this reason, even if it is concerned with a case starting from the curve of FIG. 21, with respect to colors besides the gray axis, the influence of "taste" is kept contained. Accordingly, even if the color conversion parameters (the second color conversion parameter) is determined providing the curves of FIG. 21 as starting points to be set up to the data conversion algorithm 60 in FIG. 12(A), the data conversion algorithm 60 is used only in determination of values of K.

In the second K-function creating step (step f) of the color conversion definition creating method in FIG. 4, the second color conversion algorithm is determined in the manner as mentioned above to be set up to the data conversion algorithm 60 shown in FIG. 12(A), and thereafter, in a similar fashion to that of the above-mentioned first K-function creating step (step d), but $C_bM_bY_b$ data on not only the gray axis ($C_b=M_b=Y_b$) but also the whole color spaces of $C_bM_bY_b$ color system are fed to the data conversion algorithm 60 shown in FIG. 12(A), and of $C_{out}$, $M_{out}$, $Y_{out}$ and $K_{out}$ data, $K_{out}$ data is determined, so that the second function $K_2=K_{out}$ ($C_b$, $M_b$, $Y_b$) of K, wherein three of $C_b$, $M_b$, $Y_b$ are provided as variables, is determined.

The second function $K_2=K_{out}$ ($C_b$, $M_b$, $Y_b$) of K thus determined has the printing aptitude on not only the gray axis, but also the whole color spaces of $C_bM_bY_b$ color system.

Next, in the second association creating step (step g) of the color conversion definition creating method in FIG. 4, there are determined $C_{out}$, $M_{out}$, $Y_{out}$ and $K_{out}$ data associated with the calorimetric data L*a*b* which are the same as the calorimetric data L*a*b* associated with $C_bM_bY_b$ data. In the above-mentioned first association creating step (step e), there are determined $C_{out}$, $M_{out}$, $Y_{out}$ and $K_{out}$ data matched to $C_bM_bY_b$ data on a calorimetric basis on only the gray axis of $C_b=M_b=Y_b$, and thereby determining the first association (cf. FIG. 21) between $C_bM_bY_b$ data and $C_{out}$, $M_{out}$, $Y_{out}$ and $K_{out}$ data. On the other hand, in the second association creating step (step g), there is determined the association (the second association) between the $C_bM_bY_b$ data, which are same on a calorimetric basis, and $C_{out}$, $M_{out}$, $Y_{out}$ and $K_{out}$ data over not only the gray axis of $C_b=M_b=Y_b$, but also the whole color spaces of $C_bM_bY_b$ color system. The way of determining the second association is the same as that of first association in the first association creating step (step e). Thus, redundant explanation will be omitted. In the first association creating step (step e), $C_{out}$, $M_{out}$, $Y_{out}$ and $K_{out}$ data are determined while being restricted by the first function $K_1=K_{out}$ ($C_{out}$). On the other hand, in the second association creating step (step f), $C_{out}$, $M_{out}$, $Y_{out}$ and $K_{out}$ data are determined providing the second function $K_2=K_{out}$ ($C_b$, $M_b$, $Y_b$) as the restriction condition.

Figure 22:
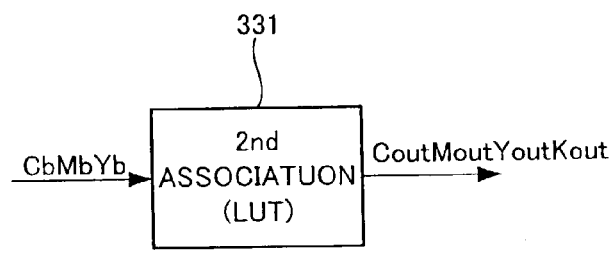
FIG. 22 is a conceptual view showing a second association.

FIG. 22 is a conceptual view showing a second association.

FIG. 22 shows in form of LUT a second association 331 for providing the association between $C_bM_bY_b$ data as to the whole color space of the $C_bM_bY_b$ color system and $C_{out}$, $M_{out}$, $Y_{out}$ and $K_{out}$ data matched with the $C_bM_bY_b$ data on a calorimetric basis, which are determined through the above-mentioned processing.

The second association is restricted, as to $K_{out}$, by the second function $K_2=K_{out}$ ($C_b$, $M_b$, $Y_b$) of K determined by the data conversion algorithm 60 (cf. FIG. 12(A)) set up with the second color conversion parameter in the second K-function creating step (step f). Accordingly, $C_{out}$, $M_{out}$, $Y_{out}$ and $K_{out}$ data, which are determined wherein the second association is provided as the restriction condition, have the printing aptitude for the printing system 12 (cf. FIG. 1) of interest, and are data matched with $C_bM_bY_b$ data on a calorimetric basis.

Thus, there is determined throughout the whole color space the color conversion definition for converting RGB data for a printer into $C_{out}$, $M_{out}$, $Y_{out}$ and $K_{out}$ data for printing having the printing aptitude for the printing system of interest and matched on a calorimetric basis.

Figure 23:
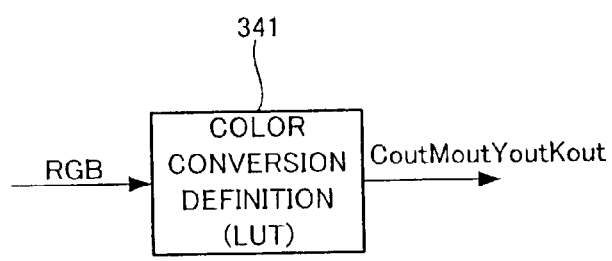
FIG. 23 is a conceptual view showing a color conversion definition defining a relation of color conversion between RGB data for a printer and $C_{out}$ $M_{out}$ $Y_{out}$ and $K_{out}$ data for printing.

FIG. 23 is a conceptual view showing a color conversion definition defining a relation of color conversion between RGB data for a printer and $C_{out}$ $M_{out}$ $Y_{out}$ and $K_{out}$ data for printing.

A color conversion definition 341 is determined in form of LUT.

RGB data for a printer are converted into CMYK data for printing matched with RGB data on a calorimetric basis and having the printing aptitude, through a conversion of primary colors RGB from XYZ by the printer profile 301 shown in FIG. 10, the transformation 302 from L*a*b* to XYZ, and the data conversion 311 shown in FIG. 11 according to the data of the formula (1); a conversion by the logarithmic transformation 312 of FIG. 11 from the primary colors RGB into CMY ($C_bM_bY_b$); and a conversion by the second association 331 shown in FIG. 22 from $C_bM_bY_b$ into $C_{out}$, $M_{out}$, $Y_{out}$ and $K_{out}$ data.

FIG. 23 shows a process of converting RGB data for printer into CMYK data for printing in form of the color conversion definition 341 in united body.

The color conversion definition 341 is set up to the color conversion apparatus 10 shown in FIG. 1. The color conversion apparatus 10 receives RGB data for printer representative of the printing image 11a to convert the received RGB data for printer into CMYK data for printing. The CMYK data for printing is data involved the aptitude for printing by the printing system 12. The CMYK data obtained in the color conversion apparatus 10 is fed to the printing system 12 to create the printed image 12a. The color represented on the printed image 12a is coincident with the color represented on the printing image 11a with great accuracy.

As mentioned above, according to the present invention, it is possible to create a color conversion definition defining a relation of color conversion between RGB data and CMYK data, which is excellent in the printing aptitude and matched with RGB data on a calorimetric basis with great accuracy.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A color conversion definition creating method of creating a color conversion definition defining a relation of data conversion between RGB data representative of a combination of values of R, G and B for a printer and CMYK data representative of a combination of values of C, M, Y and K for printing to perform printing in which a color of an image outputted by a printer receiving the RGB data and outputting the image is reproduced, said color conversion definition creating method comprising:

a first conversion step of converting RGB data for a printer into calorimetric data of device non-dependence in accordance with a printer profile representative of color reproduction characteristic of the printer;

a second conversion step of converting the calorimetric data determined in said first conversion step into CMY data representative of a combination of values of C, M and Y;

a first K-function creating step of setting up a first color conversion parameter and determines a first function of K from CMY data of C=M=Y of CMY data determined in said second conversion step in accordance with a data conversion algorithm for converting the CMY data into CMYK data having a printing aptitude according to the first color conversion parameter set up;

a first association creating step of determining CMYK data bound by the first function of K determined in said first K-function creating step, associated with the same calorimetric data as the calorimetric data associated with CMY data of C=M=Y of the CMY data determined in said second conversion step, in accordance with a printing profile representative of color reproduction characteristic of printing, so that a first association for providing an association between the CMY data of C=M=Y and the CMYK data is determined;

a second K-function creating step of setting up a second color conversion parameter value based on the first association determined in said first association creating step instead of the first color conversion parameter, on the data conversion algorithm, and determining a second function of K over an arbitrary combination of C, M and Y from the CMY data determined in said second conversion step, in accordance with the data conversion algorithm on which the second color conversion parameter value is set up; and a second association creating step of determining CMYK data bound by the second function of K determined in said second K-function creating step, associated with the same calorimetric data as the calorimetric data associated with an arbitrary combination of C, M and Y of the CMY data determined in said second conversion step, in accordance with the printing profile, so that a second association for providing an association between the arbitrary combination of C, M and Y of the CMY data and the CMYK data is determined.

2. A color conversion definition creating method according to claim 1, wherein said second conversion step comprises a three primary colors RGB data creating step of converting the calorimetric data into three primary colors RGB data representative of a combination of values of R, G and B, and a CMY data creating step of creating CMY data in such a manner that values of three primary colors R, G and B represented by the three primary colors RGB data obtained in said three primary colors RGB data creating step are subjected to a logarithmic transformation.

3. A color conversion definition creating method according to claim 2, wherein said color conversion definition creating method further comprises a parameter computing step of computing parameters for converting calorimetric data into three primary colors RGB data in accordance with a chromaticity value of a predetermined white point on x-y chromaticity diagram and chromaticity values of three points associated with RGB three primary colors on the x-y chromaticity diagram, and said three primary colors RGB data creating step converts the calorimetric data into three primary colors RGB data in accordance with the parameters computed in said parameter computing step.

4. A color conversion definition creating method according to claim 3, wherein in said parameter computing step, defined as three points associated with RGB three primary colors are vertexes of a triangle including a reproducible color gamut, which are located at three straight lines on the x-y chromaticity diagram, coupling the predetermined white point on x-y chromaticity diagram with three points representative of main wavelengths of RGB three primary colors of the reproducible color gamut on the x-y chromaticity diagram associated with a gathering of full colors capable of being reproduced in a calorimetric system for obtaining the printer profile.

5. A color conversion definition creating apparatus for creating a color conversion definition defining a relation of data conversion between RGB data representative of a combination of values of R, G and B for a printer and CMYK data representative of a combination of values of C, M, Y and K for printing to perform printing in which a color of an image outputted by a printer receiving the RGB data and outputting the image is reproduced, said color conversion definition creating method comprising:

a first conversion section for converting RGB data for a printer into calorimetric data of device non-dependence in accordance with a printer profile representative of color reproduction characteristic of the printer;

a second conversion section for converting the calorimetric data determined in said first conversion section into CMY data representative of a combination of values of C, M and Y;

a first K-function creating section for setting up a first color conversion parameter and determines a first function of K from CMY data of C=M=Y of CMY data determined in said second conversion section in accordance with a data conversion algorithm for converting the CMY data into CMYK data having a printing aptitude according to the first color conversion parameter set up;

a first association creating section for determining CMYK data bound by the first function of K determined in said first K-function creating section, associated with the same calorimetric data as the calorimetric data associated with CMY data of C=M=Y of the CMY data determined in said second conversion section, in accordance with a printing profile representative of color reproduction characteristic of printing, so that a first association for providing an association between the CMY data of C=M=Y and the CMYK data is determined;

a second K-function creating section for setting up a second color conversion parameter value based on the first association determined in said first association creating section instead of the first color conversion parameter, on the data conversion algorithm, and determining a second function of K over an arbitrary combination of C, M and Y from the CMY data determined in said second conversion section, in accordance with the data conversion algorithm on which the second color conversion parameter value is set up; and a second association creating section for determining CMYK data bound by the second function of K determined in said second K-function creating section, associated with the same calorimetric data as the calorimetric data associated with an arbitrary combination of C, M and Y of the CMY data determined in said second conversion section, in accordance with the printing profile, so that a second association for providing an association between the arbitrary combination of C, M and Y of the CMY data and the CMYK data is determined.

6. A color conversion definition creating program storage medium storing a color conversion definition creating program which causes a computer to operate as a color conversion definition creating apparatus, when said color conversion definition creating program is incorporated into the computer and executed, said color conversion definition creating program comprising:

a first conversion section for converting RGB data for a printer into calorimetric data of device non-dependence in accordance with a printer profile representative of color reproduction characteristic of the printer;

a second conversion section for converting the calorimetric data determined in said first conversion section into CMY data representative of a combination of values of C, M and Y;

a first K-function creating section for setting up a first color conversion parameter and determines a first function of K from CMY data of C=M=Y of CMY data determined in said second conversion section in accordance with a data conversion algorithm for converting the CMY data into CMYK data having a printing aptitude according to the first color conversion parameter set up;

a first association creating section for determining CMYK data bound by the first function of K determined in said first K-function creating section, associated with the same calorimetric data as the calorimetric data associated with CMY data of C=M=Y of the CMY data determined in said second conversion section, in accordance with a printing profile representative of color reproduction characteristic of printing, so that a first association for providing an association between the CMY data of C=M=Y and the CMYK data is determined;

a second K-function creating section for setting up a second color conversion parameter value based on the first association determined in said first association creating section instead of the first color conversion parameter, on the data conversion algorithm, and determining a second function of K over an arbitrary combination of C, M and Y from the CMY data determined in said second conversion section, in accordance with the data conversion algorithm on which the second color conversion parameter value is set up; and a second association creating section for determining CMYK data bound by the second function of K determined in said second K-function creating section, associated with the same colorimetric data as the calorimetric data associated with an arbitrary combination of C, M and Y of the CMY data determined in said second conversion section, in accordance with the printing profile, so that a second association for providing an association between the arbitrary combination of C, M and Y of the CMY data and the CMYK data is determined.

* * * * *